(12) United States Patent
Kwon

(10) Patent No.: US 12,372,691 B2
(45) Date of Patent: Jul. 29, 2025

(54) IMAGE CAPTURING LENS

(71) Applicant: LG INNOTEK CO., LTD., Seoul (KR)

(72) Inventor: Duk Keun Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 688 days.

(21) Appl. No.: 17/416,082

(22) PCT Filed: Jan. 7, 2020

(86) PCT No.: PCT/KR2020/000292
§ 371 (c)(1),
(2) Date: Jun. 18, 2021

(87) PCT Pub. No.: WO2020/145637
PCT Pub. Date: Jul. 16, 2020

(65) Prior Publication Data
US 2022/0043190 A1 Feb. 10, 2022

(30) Foreign Application Priority Data

Jan. 7, 2019 (KR) .................. 10-2019-0001948
Jan. 7, 2020 (KR) .................. 10-2020-0002085

(51) Int. Cl.
*G02B 3/14* (2006.01)
*G02B 9/12* (2006.01)
(Continued)

(52) U.S. Cl.
CPC .............. *G02B 3/14* (2013.01); *G02B 9/12* (2013.01); *G02B 9/62* (2013.01); *G02B 13/0075* (2013.01);
(Continued)

(58) Field of Classification Search
CPC ............... G02B 26/004; G02B 26/005; G02B 13/0075; G02B 3/14; G02B 9/12; G02B 9/62; G02B 13/0045
See application file for complete search history.

(56) References Cited

U.S. PATENT DOCUMENTS

2007/0247727 A1   10/2007   Kim
2009/0122162 A1*  5/2009    Shabtay ............... G03B 5/00
                                               348/240.1
(Continued)

FOREIGN PATENT DOCUMENTS

CN   101620311 A   1/2010
CN   102340624 A   2/2012
(Continued)

OTHER PUBLICATIONS

Gross et al. "Handbook of Optical Systems vol. 3: Aberration Theory and Correction of Optical Systems" Weinheim Germany, WILEY-VCH Verlag GmbH & Co. KGaA, pp. 377-379 (Year: 2007).*

*Primary Examiner* — Cara E Rakowski
(74) *Attorney, Agent, or Firm* — Birch, Stewart, Kolasch & Birch, LLP

(57) ABSTRACT

The present exemplary embodiment relates to an imaging lens system according to the present exemplary embodiment comprises: a first lens group comprising at least one solid lens; a second lens group spaced apart from the first lens group and comprising at least one solid lens; and a variable focal lens disposed between the first lens group and the second lens group, wherein the following Conditional Expression is satisfied:

$1 < THlg1/THlg2 < 2$.                                [Conditional Expression]

18 Claims, 6 Drawing Sheets

(51) Int. Cl.
    *G02B 9/62*         (2006.01)
    *G02B 13/00*       (2006.01)
    *G02B 13/18*       (2006.01)
    *G02B 26/00*       (2006.01)

(52) U.S. Cl.
    CPC ........... *G02B 13/18* (2013.01); *G02B 26/004* (2013.01); *G02B 13/0045* (2013.01)

(56) References Cited

U.S. PATENT DOCUMENTS

| | | | |
|---|---|---|---|
| 2009/0185281 A1 | 7/2009 | Hendriks | |
| 2018/0275320 A1* | 9/2018 | Hsieh | G02B 13/004 |
| 2018/0372985 A1* | 12/2018 | Nunnink | H04N 23/54 |
| 2021/0048629 A1* | 2/2021 | Kuo | G02B 26/004 |
| 2021/0173126 A1* | 6/2021 | Lee | H04M 1/0277 |

FOREIGN PATENT DOCUMENTS

| | | | | |
|---|---|---|---|---|
| CN | 106125267 | A | | 11/2016 |
| CN | 108780498 | A | | 11/2018 |
| JP | 2009-216946 | A | | 9/2009 |
| JP | 2009-543152 | A | | 12/2009 |
| KR | 10-2007-0103812 | A | | 10/2007 |
| KR | 10-2010-0101663 | A | | 9/2010 |
| KR | 10-2018-0088235 | A | | 8/2018 |
| KR | 10-2018-0099148 | A | | 9/2018 |
| WO | WO-2018044131 | A1 | * 3/2018 | ......... G02B 13/0045 |

* cited by examiner

IMAGE CAPTURING LENS

CROSS REFERENCE TO RELATED APPLICATIONS

This application is the National Phase of PCT International Application No. PCT/KR2020/000292, filed on Jan. 7, 2020, which claims priority under 35 U.S.C. § 119(a) to Patent Application No. 10-2019-0001948, filed in the Republic of Korea on Jan. 7, 2019 and Patent Application No. 10-2020-0002085, filed in the Republic of Korea on Jan. 7, 2020, all of which are hereby expressly incorporated by reference into the present application.

TECHNICAL FIELD

The present exemplary embodiment relates to an imaging lens.

BACKGROUND ART

Recently, camera modules for communication terminals, digital still cameras (DSC), camcorders, and PC cameras (imaging devices attached to personal computers) have been studied in relation to the image pickup system. One of the most important components for the camera module associated with such an image pickup system to acquire an image is an imaging lens that forms an image.

Portable terminals such as mobile phones or vehicle cameras are increasingly becoming smaller and/or lighter. In accordance with this trend, imaging lenses are also getting miniaturized. Besides, in addition to miniaturizing the imaging lenses, the performance of the imaging lenses is also required to cope with the high performance of light receiving lenses.

Imaging lenses of the prior art perform auto-focusing (AF) and optical image stabilization (OIS) functions through a lens driving device of a voice coil motor type. Therefore, there is a problem in that it is difficult to reduce the size of the entire camera module.

DETAILED DESCRIPTION OF THE INVENTION

Technical Subject

The present exemplary embodiment is intended to provide an imaging lens comprising a liquid lens.

Furthermore, the present invention is intended to provide a camera module having a reduced size compared to a camera module comprising a lens driving device of a voice coil motor type through an imaging lens according to the present exemplary embodiment.

Technical Solution

An imaging lens system according to the present exemplary embodiment comprises: a first lens group comprising at least one solid lens; a second lens group spaced apart from the first lens group and comprising at least one solid lens; and a variable focal lens disposed between the first lens group and the second lens group, wherein the following Conditional Expression 1 can be satisfied.

$1 < THlg1/THlg2 < 2$ [Conditional Expression 1]

(THlg1 in Conditional Expression 1 refers to the thickness on the optical axis of the first lens group, THlg2 refers to the thickness on the optical axis of the second lens group.)

The number of solid lenses of the first lens group may be greater than the number of solid lenses of the second lens group.

The lens closest to the object side in the first lens group may have a positive refractive index, and the lens closest to the image side in the second lens group may have a negative refractive index.

The first lens group may comprise a first lens, a second lens, and a third lens having positive refractive powers, and the second lens group may comprise a fourth lens having a positive refractive power and a fifth lens having a negative refractive power.

The imaging lens system may satisfy the following Conditional Expression 2.

$|L2R2| < |L2R1|$ [Conditional Expression 2]

(In Conditional Expression 2, L2R2 refers to a radius of curvature of an image side surface of the second lens, and L2R1 refers to a radius of curvature of an object side surface of the second lens.)

The imaging lens system may satisfy Conditional Expression 3 below.

$G2 > G1$ [Conditional Expression 3]

(In Conditional Expression 3, G1 refers to the refractive index of the material of the first lens, and G2 refers to the refractive index of the material of the second lens.)

An imaging lens system according to the present exemplary embodiment comprises: a first lens having a positive refractive power; a second lens; a third lens; a fourth lens; a fifth lens having a positive refractive power; and a sixth lens having a negative refractive power, wherein the first to sixth lenses are disposed in order from an object side to an image side, the first to third lenses and the fifth and sixth lenses are solid lenses, and the fourth lens comprises a variable focal lens, wherein Conditional Expression 4 below can be satisfied.

$|L2R2| < |L2R1|$ [Conditional Expression 4]

(In Conditional Expression 4, L2R2 refers to the radius of curvature of the image side surface of the second lens, and L2R1 refers to the radius of curvature of the object side surface of the second lens.)

An imaging lens system according to the present exemplary embodiment may comprise: a first lens group comprising at least one solid lens; a second lens group spaced apart from the first lens group and comprising at least one solid lens; and a variable focal lens disposed between the first lens group and the second lens group, wherein Conditional Expression 5 below can be satisfied.

$0.1 < THlg1/TTL < 0.5$ [Conditional Expression 5]

(In Conditional Expression 5, THlg1 refers to the thickness of the first lens group on the optical axis, and TTL refers to the distance from the object side surface of the first lens to the imaging surface on the optical axis.)

An imaging lens system according to the present exemplary embodiment comprises a first lens group comprising at least one solid lens; a second lens group spaced apart from the first lens group and comprising at least one solid lens; and a variable focal lens disposed between the first lens group and the second lens group, wherein Conditional Expression 6 below can be satisfied.

$0 < Fg1/|Fg2| < 0.5$ [Conditional Expression 6]

(In Conditional Expression 6, Fg1 refers to the focal length of the first lens group and Fg2 refers to the focal length of the second lens group.)

A camera module according to the present exemplary embodiment may comprise: an image sensor; the imaging lens system of claim 1; and a filter disposed between the image sensor and the imaging lens.

An imaging lens according to an aspect of the present invention for achieving the above objective, disposed sequentially from the object side to the image side, comprises: a first lens having a positive refractive power; a second lens having negative refractive power; a third lens; a fourth lens comprising first to fifth lens surfaces and having a variable refractive power; a fifth lens having a positive refractive power; and sixth lens having negative refractive power, wherein the third lens surface of the fourth lens becomes convex toward the image side when a voltage is applied.

In addition, the curvature radius of the object side surface of the third lens may be smaller than the curvature radius of the image side surface, and the radius of curvature of the object side surface of the fifth lens may be larger than the curvature radius of the image side surface.

In addition, a first liquid may be disposed between the second lens surface and the third lens surface, and a second liquid may be disposed between the third lens surface and the fourth lens surface.

In addition, the first liquid may be a nonconductive liquid, and the second liquid may be a conductive liquid.

In addition, the refractive power of the fourth lens may vary from negative to positive.

In addition, the refractive power of the fourth lens may vary from −50 diopters to 1000 diopters.

In addition, the refractive power of the fourth lens may vary from 0 to positive.

In addition, the refractive power of the fourth lens may vary within the range of positive.

In addition, the diameter of the second lens surface may be smaller than the diameter of the fourth lens surface.

The ratio of the diameter of the fourth lens surface to the diameter of the second lens surface may be greater than 1.1 and less than 1.6.

In addition, the refractive index of the first lens may be between 1.5 and 1.7.

In addition, the object side surface of the first lens may be convex toward the object side.

In addition, the diameter of the third lens surface of the fourth lens may become smaller when voltage is applied.

In addition, the diameter may gradually increase as it travels from the second lens to the sixth lens.

In addition, at least a portion of the image side surface of the third lens may be convex toward the image side direction.

In addition, the distance between the third lens and the fourth lens may be shorter than the distance between the fourth lens and the fifth lens.

In addition, a partial region of an object side surface of the fifth lens may be located at the image side with respect to a central region, and the end region may be located more toward the object side than the central region.

In addition, the central region of the object side surface of the fifth lens may be convex toward the object side, and the partial region may be concave toward the image side.

In addition, a central region of the object side surface of the sixth lens may be convex toward the object side.

In addition, the object side surface and the image side surface of the sixth lens may have at least one inflection point.

In addition, the first lens may have a positive refractive power, the second lens may have a negative refractive power, the fifth lens may have a positive refractive power, and the sixth lens may have a negative refractive power.

In addition, the distance between the image side surface of the third lens and the object side surface of the fifth lens may be greater than 0.5 mm.

In addition, the ratio of the distance between the image side surface of the third lens and the object side surface of the fifth lens to the distance between the object side surface of the first lens and the image sensor may be greater than 0.1.

In addition, the ratio of the distance between the image side surface of the third lens and the object side surface of the fifth lens to twice the image height may be greater than 0.1.

In addition, the ratio of the total focal length to the distance between the object side surface of the first lens and the image sensor may be between 0.5 and 1.

In addition, the ratio of the distance between the object side surface of the first lens and the image sensor to twice the image height may be between 0.5 and 1.5.

In addition, the ratio of the radius of the image side surface of the second lens to the radius of the object side surface of the third lens may be less than one.

In addition, the inverse of the focal length of the fourth lens may be between −0.05 and 0.1.

In addition, the SAG at 80% of the effective diameter of the fifth lens may be greater than zero.

In addition, it may comprise an aperture disposed between the first lens and the second lens.

An imaging lens according to an aspect of the present invention for achieving the above objective, disposed sequentially from the object side to the image side, comprises: a first lens; a second lens; a third lens; a fourth lens comprising first to fifth lens surfaces and having a variable refractive power; a fifth lens; and 6th lens, wherein the radius of curvature of the fourth lens is reduced when the voltage is applied.

An imaging lens according to an aspect of the present invention for achieving the above objective, disposed sequentially from the object side to the image side, comprises: a first lens; a second lens; a third lens; a fourth lens comprising first to fifth lens surfaces and having a variable refractive power; a fifth lens in which a portion of the object side surface is located at an image side with respect to a central region and an end region is located more toward the object side than the central region; and a sixth lens.

Advantageous Effects

Through the present exemplary embodiment, an imaging lens that may perform AF or OIS using a liquid lens can be provided.

BEST MODE

Figure 1:
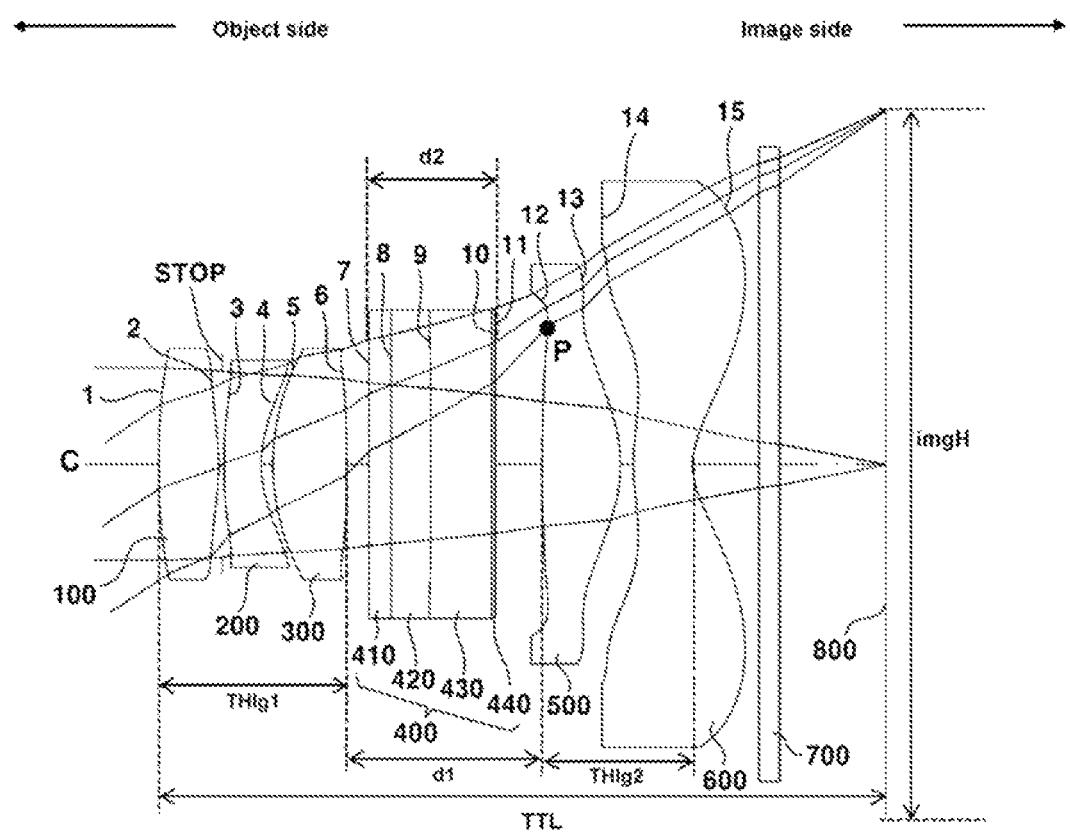
FIG. 1 is a configuration diagram of an imaging lens according to a first exemplary embodiment of the present invention.

Hereinafter, preferred exemplary embodiments of the present invention will be described in detail with reference to the accompanying drawings.

However, the technical ideas of the present invention are not limited to some exemplary embodiments described, but may be implemented in various forms, and within the technical idea of the present invention, one or more of the components between the exemplary embodiments may be selectively combined or substituted.

In addition, the terms (including technical and scientific terms) used in the exemplary embodiments of the present invention may be generally understood by those skilled in the art to which the present invention belongs, unless specifically defined and described. Commonly used terms, such as terms defined in a dictionary, may be interpreted as meanings in consideration of the contextual meaning of the related art.

In addition, the terms used in the exemplary embodiments of the present invention are intended to describe the exemplary embodiments and are not intended to limit the present invention.

In this specification, the singular may also include the plural unless specifically stated in the text, and when it is described as "at least one (or, one or more) of A, B, and C", it may include one or more of any combinations of A, B and C.

In describing the components of the exemplary embodiment of the present invention, terms such as first, second, A, B, (a), and (b) may be used. These terms are merely intended to distinguish the components from other components, and the terms do not limit the nature, order or sequence of the components.

When a component is described as being "connected", "coupled", or "jointed" to another component, it may not only include a case wherein the component is directly "connected", "coupled", or "jointed" to another component, but also include a case wherein the component is "connected", "coupled", or "jointed" to another component due to yet another component existing between the component and the other component.

In addition, when described as being formed or disposed on the "top (above)" or "bottom (below)" of each component, "top (above)" or "bottom (below)" includes not only the case where the two components are in direct contact with each other, but also the case where one or more other components are formed or disposed between the two components. In addition, when expressed as "top (above)" or "bottom (below)", it may include the meaning of the downward direction as well as the upward direction with respect to one component.

In the following description of the configuration of each lens, the 'object side surface' refers to the surface of the lens facing the object, and 'image side surface' refers to the surface of the lens facing the image plane.

Unit of length, distance, radius of curvature, thickness, and the like used hereinafter may be mm.

Hereinafter, the configuration of an imaging lens according to a first embodiment of the present invention will be described with reference to the drawings.

FIG. 1 is a configuration diagram of an imaging lens according to the first exemplary embodiment of the present invention.

An imaging lens according to the first embodiment of the present invention may comprise a plurality of lenses. The imaging lens may comprise six lenses. The imaging lens may comprise a first lens 100, a second lens 200, a third lens 300, a fourth lens 400, a fifth lens 500, a sixth lens 600, and an aperture STOP. However, in the imaging lens according to the first embodiment, one or more of the first lens 100, the second lens 200, the third lens 300, the fourth lens 400, the fifth lens 500, the sixth lens 600, and the aperture STOP may be omitted. The imaging lens may be disposed with the first lens 100, the aperture STOP, the second lens 200, the third lens 300, the fourth lens 400, the fifth lens 500, and the sixth lens 600 sequentially in order from the object side to the image side. The imaging lens according to the first embodiment may be composed of up to five lenses. Alternatively, the imaging lens according to the first embodiment may be composed of seven or more lenses.

In another exemplary embodiment, one or more of another lens, a flat plate, and an optical member may be added between the first lens 100 to the sixth lens 600. In addition, at least one of another lens, a flat plate, and an optical member may be added in front of the first lens 100 or behind the sixth lens 600. In addition, any one or more of another lens, a flat plate, and an optical member may be added between the aperture STOP and the lens, between the lens and a filter 700, and between the filter 700 and an image sensor 800. At this time, the filter 700 may be a flat lens. The refractive power of the flat lens may be '0'. There may be no refractive power of the flat lens. In addition, a filter layer may be disposed between the aperture STOP and the lens, between the lens and the filter 700, and between the filter 700 and the image sensor 800. In this case, the filter layer may be coated to become a filter.

The imaging lens may comprise a first lens 100. The first lens 100 may be closest to the object side. The first lens 100 may be a lens disposed first from the object side. The first lens 100 may be a lens adjacent first to the object side. A lens may be additionally disposed between the first lens 100 and the second lens 200. Second to fifth lenses 200, 300, 400, and 500 may be disposed between the first lens 100 and the sixth lens 600. Lenses other than the second to fifth lenses 200, 300, 400, and 500 may be additionally disposed between the first lens 100 and the sixth lens 600. A lens may be additionally disposed between at least two lenses of the first to sixth lenses 100, 200, 300, 400, 500, and 600.

The first lens 100 may have a positive refractive power. Both surfaces of the first lens 100 may be formed to be convex. Both surfaces of the first lens 100 may be formed to be convex on the optical axis. The object side surface of the first lens 100 may be formed to be convex. The object side surface of the first lens 100 may be formed to be convex on the optical axis. The first lens 100 may comprise an object side surface having a convex shape. The first lens 100 may comprise an object side surface having a convex shape on the optical axis. The image side surface of the first lens 100 may be formed to be convex. The image side surface of the first lens 100 may be formed to be convex on the optical axis. The first lens 100 may comprise an image side surface having a convex shape. The first lens 100 may comprise an image side surface having a convex shape on the optical axis. The object side surface or the image side surface of the first lens 100 may comprise at least one inflection point. The image side surface of the first lens 100 may be recessed toward the object side as it travels from the central portion to the peripheral portion side. The image side surface of the first lens 100 may be protruded toward the image side as it travels from the peripheral portion toward the outermost region.

The radius of curvature of the object side surface of the first lens 100 may be positive. The radius of curvature at the optical axis of the object side surface of the first lens 100 may be positive. The radius of curvature of the image side surface of the first lens 100 may be negative. The radius of curvature of the image side surface in the optical axis of the first lens 100 may be negative. The absolute value of the radius of curvature of the object side surface of the first lens 100 may be greater than the absolute value of the radius of curvature of the image side surface of the first lens 100. The first lens 100 may be a solid lens.

Both surfaces of the first lens 100 may be formed to be a spherical surface. Both surfaces of the first lens 100 may be formed to be an aspheric surface. Any one surface of both surfaces of the first lens 100 may be formed to be a spherical surface, and the other surface may be formed to be an aspheric surface.

The first lens 100 may be formed of a material having a refractive index. The first lens 100 may be formed of a material having a lower refractive index than the second lens 200. The first lens 100 may be formed of a material having a higher refractive index than the third lens 300. The first lens 100 may be formed of a material having a higher refractive index than the fifth lens 500. The first lens 100 may be formed of a material having a higher refractive index than the sixth lens 600.

The first lens 100 may satisfy the range of 1.5<N1<1.7. In addition, the first lens 100 may satisfy the range of 1.53<N1<1.65. N1 is an index of refraction of the first lens 100. The first lens 100 may satisfy the range of 20<V1<60. In addition, the first lens 100 may satisfy the range of 22<V1<58. V1 is the Abbe number (Abbe #) of the first lens 100.

The imaging lens may comprise a second lens 200. The second lens 200 may be a lens disposed second from the object side. The second lens 200 may be a lens adjacent second to the object side. The second lens 200 may be disposed between the first lens 100 and the image side. The second lens 200 may be disposed at the image side than the aperture STOP. The second lens 200 may be disposed between the first lens 100 and the third lens 300. A lens may be additionally disposed between the second lens 200 and the first lens 100 or between the second lens 200 and the third lens 300.

The second lens 200 may have negative refractive power. The object side surface of the second lens 200 may be formed to be convex. The object side surface of the second lens 200 may be formed to be convex on the optical axis. The second lens 200 may comprise an object side surface having a convex shape. The second lens 200 may comprise an object side surface having a convex shape on the optical axis. The image side surface of the second lens 200 may be formed to be concave. The image side surface of the second lens 200 may be formed to be concave on the optical axis. The second lens 200 may comprise an image side surface having a concave shape. The second lens 200 may comprise an image side surface having a concave shape on the optical axis. The second lens 200 may be formed in a meniscus shape in which an object side surface is convex. The second lens 200 may be formed in a meniscus shape in which the object side surface is convex on the optical axis. The object side surface or the image side surface of the second lens 200 may comprise at least one inflection point. The object side surface of the second lens 200 may be recessed toward the image side as it travels from the central portion toward the peripheral portion side. The object side surface of the second lens 200 may be protruded toward the object side as it travels from the peripheral portion side toward the outermost region side. The diameter of the second lens 200 may be smaller than the diameter of the first lens 100. The thickness of the second lens 200 may be smaller than the thickness of the first lens 100. Based on the optical axis C, the distance between the second lens 200 and the first lens 100 may be shorter than the distance between the second lens 200 and the third lens 300.

The radius of curvature of the object side surface of the second lens 200 may be positive. The radius of curvature on the optical axis of the object side surface of the second lens 200 may be positive. The radius of curvature of the image side surface of the second lens 200 may be positive. The radius of curvature of the second lens 200 on the optical axis of the image side surface may be positive. The radius of curvature of the object side surface of the second lens 200 may be larger than the radius of curvature of the image side surface of the second lens 200. The second lens 200 may be a solid lens.

Both surfaces of the second lens 200 may be formed as spherical surfaces. Both surfaces of the second lens 200 may be formed as aspheric surfaces. One surface of both surfaces of the second lens 200 may be formed as a spherical surface, and the other surface may be formed as an aspheric surface.

The second lens 200 may be formed of a material having a refractive index. The second lens 200 may be formed of a material having a higher refractive index than the first lens 100. The second lens 200 may be formed of a material having a higher refractive index than the third lens 300. The second lens 200 may be formed of a material having a higher refractive index than the fifth lens 500. The second lens 200 may be formed of a material having a higher refractive index than the sixth lens 600.

The second lens 200 may satisfy the range of 1.6<N2<1.7. In addition, the second lens 200 may satisfy the range of 1.64<N2<1.68. N2 is an index of refraction of the second lens 200. The second lens 200 may satisfy the range of 15<V2<25. In addition, the second lens 200 may satisfy the range of 17<V2<20. V2 is the Abbe number (Abbe #) of the second lens 200.

The imaging lens may comprise a third lens 300. The third lens 300 may be a lens disposed third from the object side. The third lens 300 may be a lens adjacent third to the object side. The third lens 300 may be disposed between the second lens 200 and the image side. The third lens 300 may be disposed between the third lens 300 and the fourth lens 400. The third lens 300 may be disposed between the second lens 200 and the fourth lens 400. A lens may be additionally disposed between the third lens 300 and the second lens 200 or between the third lens 300 and the fourth lens 400.

The third lens 300 may have a positive refractive power. Both surfaces of the third lens 300 may be formed to be convex. Both surfaces of the third lens 300 may be formed to be convex on the optical axis. The object side surface of the third lens 300 may be formed to be convex. The third lens 300 may have a convex object side surface on the optical axis. The third lens 300 may comprise an object side surface having a convex shape. The third lens 300 may comprise an object side surface having a convex shape on the optical axis. The image side surface of the third lens 300 may be formed to be convex. The image side surface of the third lens 300 may be formed to be convex on the optical axis. The third lens 300 may comprise an image side surface having a convex shape. The third lens 300 may comprise an image side surface having a convex shape on the optical axis. At least a portion of the image side surface of the third lens 300 may comprise a surface convex in the image side direction. The object side surface or the image side surface of the third lens 300 may comprise at least one inflection point. The object side surface of the third lens 300 may be protruded toward the image side as it travels from the central portion toward the peripheral portion side. The image side surface of the third lens 300 may be formed to become more planar as it travels from the peripheral portion side toward the outermost region side. The diameter of the third lens 300 may be formed to have a size corresponding to the diameter of the first lens 100. The thickness of the third lens 300 may be formed to a size corresponding to the thickness of the first lens 100. The diameter of the third lens 300 may be smaller than the diameter of the fourth lens 400. The thickness of the third lens 300 may be smaller than the thickness of the fourth lens 400. Based on the optical axis C, the distance between the third lens 300 and the second lens 200 may be shorter than the distance between the third lens 300 and the fourth lens 400.

The radius of curvature of the third lens 300 on the object side surface may be positive. The radius of curvature of the object side surface of the third lens 300 on the optical axis may be positive. The radius of curvature of the image side surface of the third lens 300 may be negative. The radius of curvature of the image side surface of the third lens 300 on the optical axis may be negative. The absolute value of the radius of curvature of the object side surface of the third lens 300 may be smaller than the absolute value of the radius of curvature of the image side surface of the third lens 300. The third lens 300 may be a solid lens.

Both surfaces of the third lens 300 may be formed as spherical surfaces. Both surfaces of the third lens 300 may be formed as aspheric surfaces. One surface of both surfaces of the third lens 300 may be formed as a spherical surface and the other surface may be formed as an aspheric surface.

The third lens 300 may be formed of a material having a refractive index. The third lens 300 may be formed of a material having a refractive index lower than the first lens 100. The third lens 300 may be formed of a material having a lower refractive index than the second lens 200. The third lens 300 may be formed of a material having the same refractive index as the fifth lens 500. The third lens 300 may be formed of a material having a higher refractive index than the sixth lens 600.

The third lens 300 may satisfy the range of 1.5<N3<1.6. In addition, the third lens 300 may satisfy the range of 1.52<N3<1.58. N3 is an index of refraction of the third lens 300. The third lens 300 may satisfy the range of 50<V3<60. In addition, the third lens 300 may satisfy the range of 52<V3<58. V3 is the Abbe number (Abbe #) of the third lens 300.

The imaging lens may comprise a fourth lens 400. The fourth lens 400 may be a lens to be disposed fourth from the object side. The fourth lens 400 may be a lens adjacent fourth to the object side. The fourth lens 400 may be a lens disposed third from the image side. The fourth lens 400 may be a lens adjacent third to the image side. The fourth lens 400 may be disposed between the third lens 300 and the image side. The fourth lens 400 may be disposed between the third lens 300 and the fifth lens 500. A lens may be additionally disposed between the fourth lens 400 and the third lens 300 or between the fourth lens 400 and the fifth lens 500.

The diameter of the fourth lens 400 may be larger than that of the first to third lenses 100, 200, and 300. Based on the optical axis C, the distance between the fourth lens 400 and the third lens 300 may be shorter than the distance between the fourth lens 400 and the fifth lens 500. The inverse of the focal length of the fourth lens 400 may be between −0.05 and 0.1.

The fourth lens 400 may comprise a variable focal lens. The variable focal lens may comprise a variable lens surface. The fourth lens 400 may comprise first to fifth lens surfaces 7, 8, 9, 10, and 11. The variable focal lens may comprise a liquid lens. The fourth lens 400 may comprise a liquid lens. The liquid lens may be a liquid lens comprising two kinds of liquids. The liquid lens comprising two types of liquids may comprise a conductive liquid and a nonconductive liquid. In this case, the focal point may be changed by adjusting an interface formed between the conductive liquid and the nonconductive liquid by using a voltage applied to the liquid lens. The liquid lens may be disposed between the third lens 300 and the fifth lens 500. The liquid lens may be disposed between the solid lenses. The liquid lens may be spaced apart from the solid lens. The liquid lens may be a variable lens. The liquid lens may be an auto focus lens.

The liquid lens may comprise a first liquid 420. The first liquid 420 may be disposed between a second plate 410 and a third plate 440. The first liquid 420 may have conductivity. The first liquid 420 may be in contact with a second liquid 430. The image side surface of the first liquid 420 may be in contact with the object side surface of the second liquid 430. The liquid lens may comprise a second liquid 430. The second liquid 430 may be disposed between the second plate 410 and the third plate 440. The second liquid 430 may have non-conductivity. As a modified example, the first liquid 420 may be non-conductive and the second liquid 430 may be conductive.

The liquid lens may comprise an interface surface. The interface surface may be formed by contacting the first liquid 420 and the second liquid 430. The interface surface may be formed by contacting an image side of the first liquid 420 and an object side of the second liquid 430. The interface surface may be a refractive surface. The curvature of the interface surface may vary depending on a voltage being applied.

As a modified example, the liquid lens may be a liquid lens containing one type of liquid. A liquid lens comprising one type of liquid may change the focus by adjusting a membrane disposed at a position corresponding to the liquid. For example, the focus can be changed by pressing the membrane by the electromagnetic force of the magnet and the coil. Alternatively, the liquid lens may be a liquid lens comprising three or more types of liquids.

The liquid lens may comprise a first plate comprising a cavity in which a conductive liquid and a nonconductive liquid are disposed. The liquid lens may comprise an electrode disposed on the first plate. The liquid lens whose focal length is adjusted in response to the driving voltage may receive an operating voltage through the electrode. The electrodes of the liquid lens may comprise individual electrodes and a common electrode. There may be one common electrode, and a plurality of individual electrodes may be provided. For example, the individual electrodes may comprise four or eight individual electrodes of the liquid lens. Individual electrodes may be disposed on a first surface of the first plate. The common electrode may be disposed on a second surface of the first plate. The common electrode may be disposed on the second surface opposite to the first surface of the liquid lens. When an operating voltage is applied through the individual electrodes and the common electrode, the interface surface between the conductive liquid and the nonconductive liquid disposed in the lens region may be deformed.

One side of the liquid lens may receive a voltage from the individual electrodes. The other side of the liquid lens may receive a voltage from the common electrode. In this way, any one or more of an AF function and an OIS function may be performed.

The fourth lens 400 may comprise a second plate 410. The second plate may be disposed on one side of the first plate 415. The second plate 410 may be spaced apart from the third plate 440. The third plate 440 may be disposed on the other side of the first plate 415. The first plate 415 may be disposed between the second plate 410 and the third plate 440. The second plate 410 may be spaced apart from the third plate 440 on the optical axis direction. The second plate 410 may be disposed closer to the object side than the third plate 440. The second plate 410 may cover the object side surface of the first liquid 420. The second plate 410 may be formed of a flat plate. The second plate 410 may have a refractive power of '0'. The second plate 410 may contact the first liquid 420. The distance between the second plate 410 and the third lens 300 on the optical axis may be smaller than the distance between the third plate 440 and the fifth lens 500 on the optical axis. The length in the direction perpendicular to the optical axis of the second plate 410 may correspond to the length in the corresponding direction of the third plate 440.

The fourth lens 400 may comprise a third plate 440. The third plate 440 may be spaced apart from the second plate 410. The third plate 440 may be spaced apart from the second plate 410 on the optical axis direction. The third plate 440 may be disposed closer to the image side than the second plate 410. The third plate 440 may cover the image side surface of the second liquid 430. The third plate 440 may be formed of a flat plate. The third plate 440 may have a refractive power of '0'. The third plate 440 may contact the second liquid 430. The length in the direction perpendicular to the optical axis of the third plate 440 may correspond to the length in the corresponding direction of the second plate 410.

The liquid lens may comprise a first liquid 420. The first liquid 420 may be disposed between the second plate 410 and the third plate 440. In addition, the first liquid 420 may be disposed between a second lens surface 8 and a third lens surface 9. The first liquid 420 may have conductivity.

The liquid lens may comprise a second liquid 430. The second liquid 430 may be disposed between the second plate 410 and the third plate 440. In addition, the second liquid 430 may be disposed between the third lens surface 9 and a fourth lens surface 10. The second liquid 430 may have non-conductivity.

When a voltage is applied, the third lens surface 9 of the fourth lens 400 may be convex on the image side direction. When a voltage is applied, the second lens surface 8 of the fourth lens 400 may have a smaller diameter or radius of curvature. Through this, the fourth lens 400 may have a variable refractive power. For example, the refractive power of the fourth lens 400 may vary from negative to positive. In this case, the refractive power of the fourth lens 400 may vary within a range of −50 diopters to 1000 diopters. Alternatively, the fourth lens 400 may vary from 0 to positive or within a range of positive.

The diameter of the second lens surface 8 of the fourth lens 400 may be smaller than the diameter of the fourth lens surface 10. At this time, the ratio of the diameter of the fourth lens surface 10 to the diameter of the second lens surface 8 may be between 1.1 and 1.6. Through this, light passing through the fourth lens 400 may be efficiently received by the image sensor 800.

Hereinafter, the liquid lens will be described with reference to a cross-sectional view of the fourth lens 400 of the imaging lens according to the present exemplary embodiment.

Figure 4:
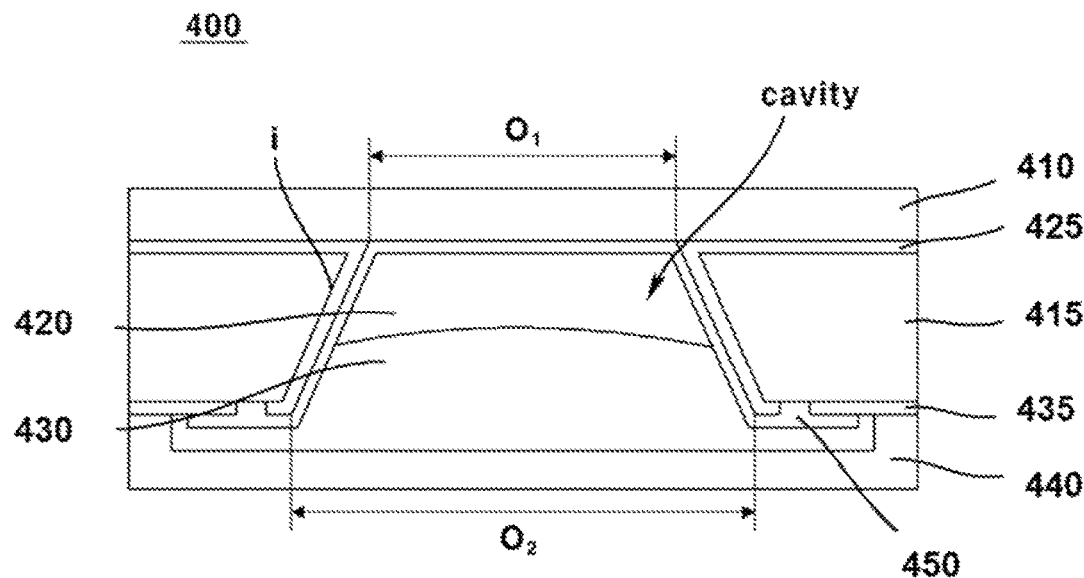
FIG. 4 and FIG. 5 is a cross-sectional view of a fourth lens of the imaging lens according to the present exemplary embodiment.
Figure 5:
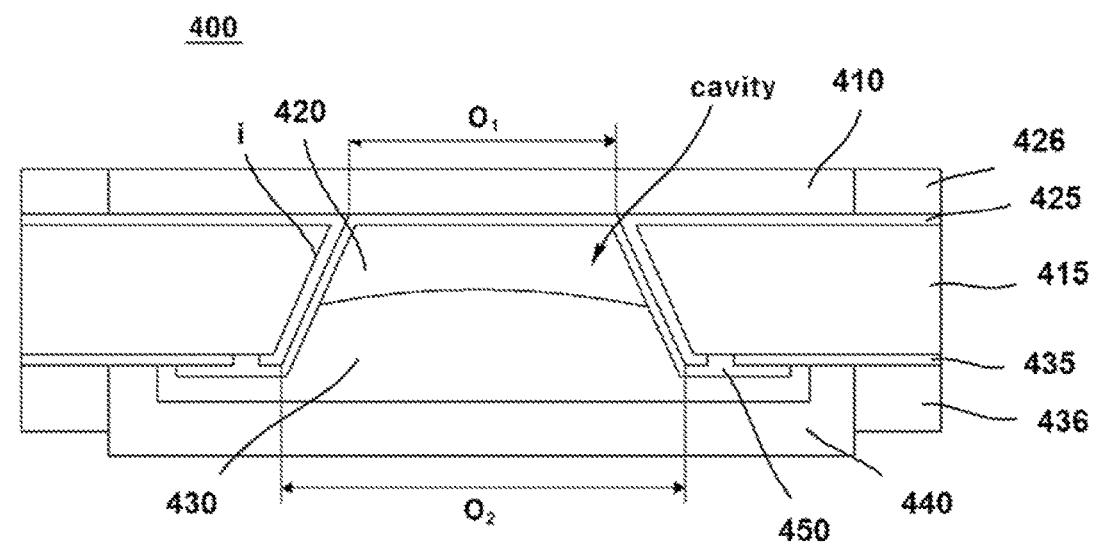

FIGS. 4 and 5 are cross-sectional views of the fourth lens 400 of the imaging lens according to the present exemplary embodiment.

The fourth lens 400 may be a liquid lens 400. The liquid lens 400 may comprise a first liquid 420, a second liquid 430, a first plate 415, a first electrode 425, and a second electrode 435. The first liquid 420 may comprise a nonconductive liquid. For example, the first liquid 420 may be an oil. The second liquid 430 may comprise a conductive liquid. For example, the second liquid 430 may be a water.

The first plate 415 may comprise a cavity in which the first liquid 420 and the second liquid 430 are disposed. Electrodes 425 and 435 may be disposed above or below the first plate 415. For example, the first electrode 425 may be disposed below the first plate 415, and the second electrode 435 may be disposed above the first plate 415. The second plate 410 and/or the third plate 440 may be disposed above or below the first plate 415. For example, the third plate 440 may be disposed below the second electrode 435, the second plate 410 may be disposed above the first electrode 425, the second plate 410 may be disposed on the first electrode 425, and at least one of the second plate 410 and the third plate 440 may be omitted.

The first plate 415 may be disposed between the second plate 410 and the third plate 440, and may comprise upper and lower openings having predetermined inclined surfaces (for example, inclined surfaces having an angle of about 55 to 65 degrees or 50 to 70 degrees). A region surrounded by the above described inclined surface, a first opening in contact with the second plate 410, and a second opening adjacent to the third plate 440 may be referred to as a 'cavity'.

Here, the size of the openings may mean a cross-sectional area in the horizontal direction, or a radius if the cross section of the opening is circular, and the length of a diagonal line if it is square.

The first plate 415 is a structure for accommodating the first and second liquids 420 and 430. Since the second plate 410 and the third plate 440 comprise a region through which light passes, the second plate 410 and the third plate 440 may be made of a light transmissive material, for example, glass; and the second plate 410 and the third plate 440 may be formed of the same material for the convenience of the process.

In addition, the first plate 415 may be made of a transparent material, or may comprise impurities so that light is not easily transmitted.

The second plate 410 is configured to be incident when the light incident from the third lens 300 proceeds into the cavity, and the third plate 440 is configured to pass the light that has passed through the cavity proceeds to the fifth lens 500.

The above-described cavity may be filled with the first liquid 420 and the second liquid 430 having different properties, and an interface surface may be formed between the first liquid 420 and the second liquid 430. The interface surface formed by the first liquid 420 and the second liquid 430 may vary in curvature, inclination, and the like.

The first electrode 425 may be disposed in a portion of the lower surface of the first plate 415 and may directly contact the first liquid 420. The second electrode 435 may be spaced apart from the first electrode 425, and may be disposed on the upper surface, the side surface, and the lower surface of the first plate 415.

The inner side surface of the first plate 415 may form the sidewall i of the cavity. An insulating layer 450 may be disposed between the first liquid 420 or the second liquid 430 and the first electrode 425. A portion of the second liquid 430 and a portion of the second electrode 435 may be in contact with each other. The first electrode 425 and the second electrode 435 may be applied with an electrical signal received from an external circuit board to control the interface surface between the first liquid 420 and the second liquid 430.

The first electrode 425 and the second electrode 435 may be made of a conductive material, for example, metal.

The insulating layer 450 may be disposed to cover a portion of the lower surface of the second plate 410 and a portion of the first electrode 425 forming sidewalls of the cavity in the upper region of the cavity. In addition, the insulating layer 450 may be disposed on the lower surface of the first plate 415 to cover a portion of the first electrode 425, the first plate 415, and the second electrode 435.

As illustrated, an insulating layer 450 may be disposed between the first liquid 420 and the second plate 410. The second liquid 430 may be in contact with the third plate 440 directly.

Edges of the second plate 410 and the third plate 440 may be rectangular, but are not limited thereto.

The first electrode 425 may be exposed in at least one region in the periphery of the second plate 410, and the second electrode 435 may be exposed in at least one region of the edges of the third plate 440.

And, a first contact electrode 426 is disposed on the first electrode 425 in the outer region of the second plate 410, and a second contact electrode 436 is disposed on the second electrode 435 in the outer region of the third plate 400. The first and second contact electrodes 426 and 436 may be a portion of a connection substrate.

Although not illustrated, a conductive epoxy may be disposed between the first electrode 425 and the first contact electrode 426, and a conductive epoxy may be disposed between the second electrode 435 and the second contact electrode 436. In addition, the first contact electrode 426 and the second contact electrode 436 may be integrally provided with the first electrode 425 and the second electrode 435, respectively.

Therefore, in the imaging lens comprising the liquid lens 400 according to one exemplary embodiment of the present invention, the distance from the object side surface of the first lens 100 to the image side surface of the sixth lens 600 is fixed, and the focal length, diopter, and the like of the liquid lens 400 can be varied. That is, auto focusing (AF) may be possible without moving the lenses 100, 200, 300, 400, 500, and 600 inside the imaging lens.

The imaging lens may comprise a fifth lens 500. The fifth lens 500 may be a lens disposed second from the image side. The fifth lens 500 may be a lens adjacent second on the image side. The fifth lens 500 may be disposed between the fourth lens 400 and the image side. The fifth lens 500 may be disposed between the fourth lens 400 and the sixth lens 600. A lens may be additionally disposed between the fifth lens 500 and the fourth lens 400 or between the fifth lens 500 and the sixth lens 600.

The fifth lens 500 may have a refractive power of positive or negative. The object side surface of the fifth lens 500 may be formed to be concave. The central region of the object side surface of the fifth lens 500 adjacent to the optical axis C may be formed to be convex toward the object side. An end region of the object side surface of the fifth lens 500 that is spaced apart farthest from the optical axis C may be located more toward the object side than the central region. At least a portion of the portion connecting the central region and the end region of the object side surface of the fifth lens 500 may be positioned more toward the image side than the central region. A portion connecting the central region and the end region of the object side surface of the fifth lens 500 may be formed to be concave toward the image side. The image side surface of the fifth lens 500 may be formed to be convex toward the image side. Alternatively, the object side surface of the fifth lens 500 may be formed to be concave on the optical axis. The fifth lens 500 may comprise an object side surface having a concave shape. The fifth lens 500 may comprise an object side surface having a concave shape on the optical axis. The image side surface of the fifth lens 500 may be formed to be convex. The image side surface of the fifth lens 500 may be formed to be convex on the optical axis. The fifth lens 500 may comprise an image side surface having a convex shape. The fifth lens 500 may comprise an image side surface having a convex shape on the optical axis. The fifth lens 500 may be formed in a meniscus shape in which an image side surface is convex. The fifth lens 500 may be formed in a meniscus shape in which the image side surface is convex on the optical axis. The object side surface or the image side surface of the fifth lens 500 may comprise at least one inflection point. The object side surface of the fifth lens 500 may be recessed more toward the image side as it travels from the center portion toward the peripheral portion side. The object side surface of the fifth lens 500 may be more protruded toward the object side as it travels from the peripheral portion toward the outermost region. The object side surface of the fifth lens 500 may be formed to become more planar as it travels from the peripheral portion toward the outermost region side. The image side surface of the fifth lens 500 may be more recessed toward the object side as it travels from the central portion toward the peripheral side. The image side surface of the fifth lens 500 may be more protruded toward the image side as it travels from the peripheral portion toward the outermost region. The diameter of the fifth lens 500 may be larger than the diameter of the fourth lens 400. The thickness of the fifth lens 500 may be greater than the thickness of the fourth lens 400. Based on the optical axis C, the distance between the fifth lens 500 and the fourth lens 400 may be longer than the distance between the fifth lens 500 and the sixth lens 600.

The radius of curvature of the object side surface of the fifth lens 500 may be negative. The radius of curvature of the object side surface of the fifth lens 500 may be negative on the optical axis. The radius of curvature of the image side surface of the fifth lens 500 may be negative. The radius of curvature of the image side surface of the fifth lens 500 may be negative on the optical axis. The absolute value of the radius of curvature of the object side surface of the fifth lens 500 may be greater than the absolute value of the radius of curvature of the image side surface of the fifth lens 500. The fifth lens 500 may be a solid lens.

Both surfaces of the fifth lens 500 may be formed to be spherical surfaces. Both surfaces of the fifth lens 500 may be formed to be aspheric surfaces. One surface of both surfaces of the fifth lens 500 may be formed to be a spherical surface, and the other surface may be formed to be an aspheric surface.

The fifth lens 500 may be formed of a material having a refractive index. The fifth lens 500 may be formed of a material having a lower refractive index than the first lens 100. The fifth lens 500 may be formed of a material having a lower refractive index than the second lens 200. The fifth lens 500 may be formed of a material having the same refractive index as the third lens 300. The fifth lens 500 may be formed of a material having a higher refractive index than the sixth lens 600.

The fifth lens 500 may satisfy the range of $1.5<N5<1.6$. In addition, the fifth lens 500 may satisfy the range of $1.52<N5<1.58$. N5 is the index of refraction of the fifth lens 500. The fifth lens 500 may satisfy the range of $50<V5<60$. In addition, the fifth lens 500 may satisfy the range of $52<V5<58$. V5 is the Abbe number (Abbe #) of the fifth lens 500.

The SAG at position 80% of the effective diameter of the fifth lens 500 may be greater than zero. When a vertical line is lowered to the optical axis C in the end region, which is the effective diameter of the fifth lens 500, the intersection with the optical axis C is located more toward the object side direction than the vertex of the object side surface of the fifth lens 500. When a vertical line is lowered to the optical axis C at the 80% position P of the effective diameter of the fifth lens 500, the intersection with the optical axis C is located more toward the image side than the vertex of the object side surface of the fifth lens 500. Here, the vertex of the object side surface of the fifth lens 500 refers to the intersection point where the object side surface of the fifth lens 500 and the optical axis C meet.

The imaging lens may comprise a sixth lens 600. The sixth lens 600 may be a lens closest to the image side. The sixth lens 600 may be disposed between the fifth lens 500 and the image side. The sixth lens 600 may be disposed between the fifth lens 500 and the filter 700. A lens may be additionally disposed between the sixth lens 600 and the fifth lens 500 or between the sixth lens 600 and the filter 700.

The sixth lens 600 may have negative refractive power. The object side surface of the sixth lens 600 may be formed to be convex. The object side surface of the sixth lens 600 may be formed to be convex on the optical axis. The sixth lens 600 may comprise an object side surface having a convex shape. The sixth lens 600 may comprise an object side surface having a convex shape on the optical axis. The image side surface of the sixth lens 600 may be formed to be concave. The image side surface of the sixth lens 600 may be formed to be concave on the optical axis. The sixth lens 600 may comprise an image side surface that is concave. The sixth lens 600 may comprise an image side surface that is concave on the optical axis. The sixth lens 600 may be formed in a meniscus shape in which an object side surface is convex. The sixth lens 600 may be formed in a meniscus shape in which the object side surface is convex on the optical axis. The object side surface or the image side surface of the sixth lens 600 may comprise at least one inflection point. The object side surface of the sixth lens 600 may be more recessed toward the image side as it travels from the central portion toward the peripheral portion. The object side surface of the sixth lens 600 may be more protruded toward the object side as it travels from the peripheral portion toward the outermost region. The object side surface of the sixth lens 600 may be formed to become more planar as it travels from the peripheral portion toward the outermost region side.

The image side surface of the sixth lens 600 may be more protruded toward the image side as it travels from the center toward the peripheral side. The image side surface of the sixth lens 600 may be more recessed toward the object side as it travels from the peripheral portion toward the outermost region. The thickness of the central portion of the sixth lens 600 on the optical axis C direction may be shorter than the thickness of the remaining area on the optical axis C direction. Based on the optical axis C, the distance between the sixth lens 600 and the fifth lens 500 may be shorter than the distance between the sixth lens 600 and the filter 700. The diameter of the sixth lens 600 may be larger than the diameter of the fifth lens 500. The thickness of the sixth lens 600 may be greater than the thickness of the fifth lens 500.

The radius of curvature of the object side surface of the sixth lens 600 may be positive. The radius of curvature of the object side surface of the sixth lens 600 may be positive on the optical axis. The radius of curvature of the image side surface of the sixth lens 600 may be positive. The radius of curvature of the image side surface of the sixth lens 600 may be positive on the optical axis. The radius of curvature of the object side surface of the sixth lens 600 may be larger than the radius of curvature of the image side surface of the sixth lens 600. The sixth lens 600 may be a solid lens.

Both surfaces of the sixth lens 600 may be formed to be spherical surfaces. Both surfaces of the sixth lens 600 may be formed as aspheric surfaces. One surface of both surfaces of the sixth lens 600 may be formed to be a spherical surface, and the other surface may be formed to be an aspheric surface. The sixth lens 600 may have a surface comprising one or more inflection points.

The sixth lens 600 may be formed of a material having a refractive index. The sixth lens 600 may be formed of a material having a lower refractive index than the first lens 100. The sixth lens 600 may be formed of a material having a lower refractive index than the second lens 200. The sixth lens 600 may be formed of a material having a lower refractive index than the third lens 300. The sixth lens 600 may be formed of a material having a refractive index lower than the fifth lens 500.

The sixth lens 600 may satisfy the range of $1.5<N6<1.7$. In addition, the sixth lens 600 may satisfy the range of $1.52<N6<1.68$. N6 is an index of refraction of the sixth lens 600. The sixth lens 600 may satisfy the range of $18<V6<60$. In addition, the sixth lens 600 may satisfy the range of $20<V6<58$. V6 is the Abbe number (Abbe #) of the sixth lens 600.

All lens surfaces of the first lens 100, the second lens 200, the third lens 300, the fifth lens 500, and the sixth lens 600 may be spherical surfaces or aspheric surfaces. Each of the first lens 100, the second lens 200, the third lens 300, the fifth lens 500, and the sixth lens 600 may be formed to have spherical surfaces on both surfaces thereof. Each of the first lens 100, the second lens 200, the third lens 300, the fifth lens 500, and the sixth lens 600 may be formed to have aspheric surfaces on both surfaces thereof.

Any one of both surfaces of each of the first lens 100, the second lens 200, the third lens 300, the fifth lens 500, and the sixth lens 600 may be formed to be a spherical surface and the other surface may be formed to be an aspheric surface. The diameter may be gradually increased as it travels from the second lens 200 to the sixth lens 600 on the optical axis C. The thickness may be gradually increased as it travels from the second lens 200 to the sixth lens 600 on the optical axis C.

The imaging lens may comprise a filter 700. The filter 700 may be disposed more toward the object side than the sixth lens 600. The filter 700 may be at least one of an infrared filter and a cover glass. When the infrared filter is applied as the filter 700, the radiant heat emitted from the external light can be blocked from being transferred to the light receiving device. In addition, the infrared filter transmits visible light and reflects infrared rays to the outside.

The imaging lens may comprise an image sensor 800. The image sensor 800 may comprise a charge coupled device (CCD) or a complementary metal oxide semiconductor (CMOS). The length of the horizontal and/or vertical length of the unit pixel of the image sensor 800 may be 2 μm or less. Through this, it is possible to provide an imaging lens that can be applied to a pixel and/or a camera module having a high pixel count.

The imaging lens may comprise an aperture STOP. The aperture STOP may be disposed between the first lens 100 and the second lens 200. The aperture STOP may be disposed closer to the first lens 100 than to the second lens 200. The aperture STOP may be spaced apart from the object side surface of the second lens 200. The aperture STOP may adjust the amount of light incident from a subject. The aperture STOP may adjust the amount of light passing through the first lens 100. The aperture STOP may adjust the amount of light incident on the second lens 200. The aperture STOP may comprise a circular diameter aperture.

The imaging lens may comprise a first lens group disposed on the water side with respect to a variable focal lens (for example, a liquid lens) and a second lens group disposed on the image side with respect to the variable focal lens. Each of the first lens group and the second lens group may comprise at least one solid lens.

The cavity of the first plate on which the liquid of the liquid lens is disposed may have an inclined surface. Due to the inclined surface, the diameter of the opening adjacent to the aperture STOP of the cavity of the first plate of the liquid lens may be smaller than the diameter at the side far from the aperture STOP of the cavity of the first plate.

The imaging lens according to the first exemplary embodiment of the present invention may satisfy the following Conditional Expression 1 to Conditional Expression 65.

Conditional Expressions and exemplary embodiments described below are preferred exemplary embodiments for enhancing the effect of action, and the configuration of the optical device of the present invention can have a synergistic effect by only satisfying some of Conditional Expressions of Conditional Expressions described below.

$1.2 < d1/d2 < 1.8$ [Conditional Expression 1]

In Conditional Expression 1, d1 refers to the distance between the first lens group and the second lens group on the optical axis (for example, the distance from the image side surface of the third lens 300 to the object side surface of the fifth lens 500 on the optical axis), and d2 refers to the thickness of the fourth lens 400 on the optical axis. In addition, Conditional Expression 1 c $1.4 < d1/d2 < 1.7$.

$0 < Fg1/|Fg2| < 0.5$ [Conditional Expression 2]

In Conditional Expression 2, Fg1 refers to the combined focal length of the first lens group (for example, from the first lens 100 to the third lens 300), and Fg2 refers to the combined focal length of the second lens group (for example, from the fifth lens 500 to the sixth lens 600). Also, Conditional Expression 2 may satisfy the range of $0 < Fg1/|Fg2| < 0.3$.

$0.1 < d1/TTL < 0.4$ [Conditional Expression 3]

In Conditional Expression 3, d1 is the distance between the first lens group and the second lens group on the optical axis (for example, the distance from the image side surface of the third lens 300 to the object side surface of the fifth lens 500 on the optical axis), and TTL refers to the distance from the object side surface of the first lens 100 to the image plane on the optical axis. In addition, Conditional Expression 3 may satisfy the range of $0.2 < d1/TTL < 0.3$. In addition, Conditional Expression 3 may satisfy the range of $d1/TTL > 0.1$.

$0.1 < d1/imgH < 0.4$ [Conditional Expression 4]

In Conditional Expression 4, d1 refers to the distance between the first lens group and the second lens group on the optical axis (for example, the distance from the image side surface of the third lens 300 to the object side surface of the fifth lens 500 on the optical axis). imgH refers to the diagonal length of the image sensor 800 of the image plane. In addition, imgH may mean twice the distance from the optical axis of the image plane to the maximum image height in the vertical direction. Also, imgH may be equal to the diagonal length of the effective area 810 of the image sensor 800. In addition, Conditional Expression 4 may satisfy the range of $0.15 < d1/imgH < 0.3$.

$0.8 \text{ mm} < d1 < 2.0 \text{ mm}$ [Conditional Expression 5]

In Conditional Expression 5, d1 refers to the distance between the first lens group and the second lens group on the optical axis (for example, the distance from the image side surface of the third lens 300 to the object side surface of the fifth lens 500 on the optical axis). In addition, Conditional Expression 5 may satisfy the range of $1.0 \text{ mm} < d1 < 1.6 \text{ mm}$. In addition, Conditional Expression 5 may satisfy the range of $d1 < 0.5 \text{ mm}$.

$0.1 < THlg1/TTL < 0.5$ [Conditional Expression 6]

In Conditional Expression 6, THlg1 refers to the thickness of the first lens group on the optical axis (for example, the distance from the object side surface of the first lens 100 to the image side surface of the third lens 300 on the optical axis), and TTL refers to the distance from the object side surface of the first lens 100 to the image plane on the optical axis. In addition, Conditional Expression 6 may satisfy the range of $0.2 < THlg1/TTL < 0.35$.

$0.1 < THlg2/TTL < 0.5$ [Conditional Expression 7]

In Conditional Expression 7, THlg2 refers to the thickness of the second lens group on the optical axis (for example, the distance from the object side surface of the fifth lens 500 to the image side surface of the sixth lens 600 on the optical axis), and TTL refers to the distance from the object side surface of the first lens 100 to the image plane on the optical axis. In addition, Conditional Expression 7 may satisfy the range of $0.15 < THlg2/TTL < 0.3$.

$0.1 < THlg1/imgH < 0.4$ [Conditional Expression 8]

In Conditional Expression 8, THlg1 refers to the thickness of the first lens group on the optical axis (for example, the distance from the object side surface of the first lens 100 to the image side surface of the third lens 300 on the optical axis), and imgH refers to the diagonal length of the image plane of the image sensor 800. In addition, imgH may mean twice the distance from the optical axis of the image plane to the maximum image height in the vertical direction. In addition, imgH may be equal to the diagonal length of the effective area 810 of the image sensor 800. In addition, Conditional Expression 8 may satisfy the range of 0.15<TH1g1/imgH<0.3.

$$0.1 < THlg2/imgH < 0.4 \qquad \text{[Conditional Expression 9]}$$

In Conditional Expression 9, TH1g2 refers to the thickness of the second lens group on the optical axis (for example, the distance from the object side surface of the fifth lens 500 to the image side surface of the sixth lens 600 on the optical axis), and imgH refers to the diagonal length of the image plane of the image sensor 800. In addition, imgH may mean twice the distance from the optical axis of the image plane to the maximum image height in the vertical direction. In addition, imgH may be equal to the diagonal length of the effective area 810 of the image sensor 800. In addition, Conditional Expression 9 may satisfy the range of 0.15<TH1g2/imgH<0.3.

$$0.5 < THlg1/d1 < 1.5 \qquad \text{[Conditional Expression 10]}$$

In Conditional Expression 10, TH1g1 refers to the thickness of the first lens group on the optical axis (for example, the distance from the object side surface of the first lens 100 to the image side surface of the third lens 300 on the optical axis), and d1 refers to the distance between the first lens group and the second lens group on the optical axis (for example, the distance from the image side surface of the third lens 300 to the object side surface of the fifth lens 500 on the optical axis). In addition, Conditional Expression 10 may satisfy the range of 0.8<TH1g1/d1<1.3.

$$1 < THlg1/d2 < 2 \qquad \text{[Conditional Expression 11]}$$

In Conditional Expression 11, TH1g1 refers to the thickness of the first lens group on the optical axis (for example, the distance from the object side surface of the first lens 100 to the image side surface of the third lens 300 on the optical axis), and d2 refers to the thickness on the optical axis of the fourth lens 400. In addition, Conditional Expression 11 may satisfy the range of 1.3<TH1g1/d2<1.8.

$$0.5 < THlg2/d1 < 1.5 \qquad \text{[Conditional Expression 12]}$$

In Conditional Expression 12, TH1g2 refers to the thickness of the second lens group on the optical axis (for example, the distance from the object side surface of the fifth lens 500 to the image side surface of the sixth lens 600 on the optical axis), and d1 refers to the distance between the first lens group and the second lens group on the optical axis (for example, the distance from the image side surface of the third lens 300 to the object side surface of the fifth lens 500 on the optical axis). In addition, Conditional Expression 12 may satisfy the range of 0.7<TH1g2/d1<1.2.

$$1 < THlg2/d2 < 2 \qquad \text{[Conditional Expression 13]}$$

In Conditional Expression 13, TH1g2 refers to the thickness of the second lens group on the optical axis (for example, the distance from the object side surface of the fifth lens 500 to the image side surface of the sixth lens 600 on the optical axis), and d2 refers to the thickness of the fourth lens 400 on the optical axis. In addition, Conditional Expression 13 may satisfy the range of 1.0<TH1g2/d2<1.7.

$$0 < TTL/|D\_inf| < 8 \qquad \text{[Conditional Expression 14]}$$

In Conditional Expression 14, TTL refers to the distance from the object side surface of the first lens 100 to the image plane on the optical axis, D_inf refers to a value obtained by dividing 1000 mm by the focal length of the fourth lens 400 at the object distance infinity. In addition, Conditional Expression 14 may satisfy the range of 1<TTL/|D_inf|<5.

$$0.1 < TTL/|D\_macro| < 0.5 \qquad \text{[Conditional Expression 15]}$$

In Conditional Expression 15, TTL refers to the distance from the object side surface of the first lens 100 to the image plane on the optical axis, and D_macro refers to a value obtained by dividing 1000 mm by the focal length of the fourth lens 400 at object distance of 10 cm. In addition, Conditional Expression 15 may satisfy the range of 0.15<TTL/|D_macro|<0.4.

$$0 < imgH/|D\_inf| < 8 \qquad \text{[Conditional Expression 16]}$$

In Conditional Expression 16, imgH refers to the diagonal length of the image plane of the image sensor 800, and D_inf refers to a value obtained by dividing 1000 mm by the focal length of the fourth lens 400 at the object distance infinity. In addition, imgH may mean twice the distance from the optical axis of the image plane to the maximum image height in the vertical direction. In addition, imgH may be equal to the diagonal length of the effective area 810 of the image sensor 800. In addition, Conditional Expression 16 may satisfy the range of 1<imgH/|D_inf|<5.

$$0.1 < imgH/|D\_macro| < 0.4 \qquad \text{[Conditional Expression 17]}$$

In Conditional Expression 17, imgH refers to the diagonal length of the image plane of the image sensor 800, and D_macro refers to a value obtained by dividing 1000 mm by the focal length of the fourth lens 400 at an object distance of 10 cm. In addition, imgH may mean twice the distance from the optical axis of the image plane to the maximum image height in the vertical direction. In addition, imgH may be equal to the diagonal length of the effective area 810 of the image sensor 800. In addition, Conditional Expression 17 may satisfy the range of 0.2<imgH/|D_mac|<0.4.

$$0.6 < F\_macro/F\_inf < 1.5 \qquad \text{[Conditional Expression 18]}$$

In Conditional Expression 18, F_macro refers to the total focal length at 10 cm, and F_inf refers to the total focal length at the object distance infinity. In addition, Conditional Expression 18 may satisfy the range of 0.8<F_macro/F_inf<1.2.

$$0.5 < Fno/|D\_inf| < 2.0 \qquad \text{[Conditional Expression 19]}$$

In Conditional Expression 19, Fno refers to the F-number of the whole optics, and D_inf refers to a value obtained by dividing 1000 mm by the focal length of the fourth lens 400 at the object distance infinity. In addition, Conditional Expression 19 may satisfy the range of 0.8<Fno/D_inf<1.4.

$$0 < Fno/D\_macro < 0.4 \qquad \text{[Conditional Expression 20]}$$

In Conditional Expression 20, Fno refers to the F-number of the whole optics, and D_macro refers to a value obtained by dividing 1000 mm by the focal length of the fourth lens 400 at an object distance of 10 cm. In addition, Conditional Expression 20 may satisfy the range of 0<Fno/D_macro<0.2.

$$0.5 < Fno/d1 < 4 \qquad \text{[Conditional Expression 21]}$$

In Conditional Expression 21, Fno refers to the F-number of the whole optics, and d1 refers to the distance between the first lens group and the second lens group on the optical axis (for example, the distance from the image side surface of the third lens 300 to the object side surface of the fifth lens 500 on the optical axis). In addition, Conditional Expression 21 may satisfy the range of 1<Fno/d1<3.

$$0.5 < Fg1/TTL < 2 \qquad \text{[Conditional Expression 22]}$$

In Conditional Expression 22, Fg1 refers to the combined focal length of the first lens group (for example, from the first lens 100 to the third lens 300), and TTL refers to the distance from the object side surface of the first lens 100 to the image plane on the optical axis. In addition, Conditional Expression 22 may satisfy the range of 0.8<Fg1/TTL<1.2.

$$|Fg2|/TTL>1 \qquad \text{[Conditional Expression 23]}$$

In Conditional Expression 23, Fg2 refers to the combined focal length of the second lens group (for example, from the fifth lens 500 to the sixth lens 600), and TTL refers to the distance from the object side surface of the first lens 100 to the image plane on the optical axis. In addition, Conditional Expression 23 may satisfy the range of |Fg2|/TTL>3.

$$0.5<Fg1/imgH<1.2 \qquad \text{[Conditional Expression 24]}$$

In Conditional Expression 24, Fg1 refers to the combined focal length of the first lens group (for example, from the first lens 100 to the third lens 300), and imgH refers to the diagonal length of the image plane of the image sensor 800. In addition, imgH may mean twice the distance from the optical axis of the image plane to the maximum image height in the vertical direction. In addition, imgH may be equal to the diagonal length of the effective area 810 of the image sensor 800. In addition, Conditional Expression 24 may satisfy the range of 0.6<Fg1/imgH<1.0.

$$|Fg2|/imgH>1.0 \qquad \text{[Conditional Expression 25]}$$

In Conditional Expression 25, Fg2 refers to the combined focal length of the second lens group (for example, from the fifth lens 500 to the sixth lens 600), and imgH refers to the diagonal length of the image plane of the image sensor 800. In addition, imgH may mean twice the distance from the optical axis of the image plane to the maximum image height in the vertical direction. Also, imgH may be equal to the diagonal length of the effective area 810 of the image sensor 800. In addition, Conditional Expression 25 may satisfy the range of |Fg2|/imgH>2.

$$0<f1/|L1R1|<5 \qquad \text{[Conditional Expression 26]}$$

In Conditional Expression 26, f1 refers to the focal length of the first lens 100, and L1R1 refers to the radius of curvature of the object side surface of the first lens 100. In addition, Conditional Expression 26 may satisfy the range of 0<f1/|L1R1|<3.

$$0<L2R2/|f2|<1 \qquad \text{[Conditional Expression 27]}$$

In Conditional Expression 27, L2R2 refers to the radius of curvature of the image side surface of the second lens 200, and f2 refers to the focal length of the second lens 200. In addition, Conditional Expression 27 may satisfy the range of 0<L2R2/|f2|<0.7.

$$0.5<Fg1/f1<3.0 \qquad \text{[Conditional Expression 28]}$$

In Conditional Expression 28, Fg1 refers to the combined focal length of the first lens group (for example, from the first lens 100 to the third lens 300), and f1 refers to the focal length of the first lens 100. In addition, Conditional Expression 28 may satisfy the range of 0.8<Fg1/f1<2.0.

$$0<Fg1/|f2|<5 \qquad \text{[Conditional Expression 29]}$$

In Conditional Expression 29, Fg1 refers to the combined focal length of the first lens group (for example, from the first lens 100 to the third lens 300), and f2 refers to the focal length of the second lens 200. In addition, Conditional Expression 29 may satisfy the range of 0.5<Fg1/|f2|<4.

$$0<Fg1/|L1R1|<5 \qquad \text{[Conditional Expression 30]}$$

In Conditional Expression 30, Fg1 refers to the combined focal length of the first lens group (for example, from the first lens 100 to the third lens 300), and L1R1 refers to the radius of curvature of the object side surface of the first lens 100. Also, Conditional Expression 30 may satisfy the range of 0<Fg1/|L1R1|<2.

$$1<Fg1/L2R2<10 \qquad \text{[Conditional Expression 31]}$$

In Conditional Expression 31, Fg1 refers to the combined focal length of the first lens group (for example, from the first lens 100 to the third lens 300), and L2R2 refers to the radius of curvature of the image side surface of the second lens 200. In addition, Conditional Expression 31 may satisfy the range of 2<Fg1/L2R2<5.

$$|Fg2|/f1>1 \qquad \text{[Conditional Expression 32]}$$

In Conditional Expression 32, Fg2 refers to the combined focal length of the second lens group (for example, from the fifth lens 500 to the sixth lens 600), and f1 refers to the focal length of the first lens 100. In addition, Conditional Expression 32 may satisfy the range of |Fg2|/f1>5.

$$|Fg2|/|f2|>1 \qquad \text{[Conditional Expression 33]}$$

In Conditional Expression 33, Fg2 refers to the combined focal length of the second lens group (for example, from the fifth lens 500 to the sixth lens 600), and f2 refers to the focal length of the second lens 200. In addition, Conditional Expression 33 may satisfy the range of |Fg2/|f2|>5.

$$|Fg2|/|L1R1|>0.2 \qquad \text{[Conditional Expression 34]}$$

In Conditional Expression 34, Fg2 refers to the combined focal length of the second lens group (for example, from the fifth lens 500 to the sixth lens 600), and L1R1 refers to the radius of curvature of the object side surface of the first lens 100. Conditional Expression 34 may satisfy the range of |Fg2|/|L1R1|>0.3.

$$|Fg2|/L2R2>5 \qquad \text{[Conditional Expression 35]}$$

In Conditional Expression 35, Fg2 refers to the combined focal length of the second lens group (for example, from the fifth lens 500 to the sixth lens 600), and L2R2 refers to the radius of curvature of the image side surface of the second lens 200. In addition, Conditional Expression 35 may satisfy the range of |Fg2|/L2R2>10.

$$0<\tan(DFOV/2)/|D\_inf|<0.8 \qquad \text{[Conditional Expression 36]}$$

In Conditional Expression 36, DFOV refers to twice the angle between the light incident toward the maximum image height from the object side and the optical axis, and D_inf refers to a value obtained by dividing 1000 mm by the focal length of the fourth lens 400 at the object distance infinity. In addition, Conditional Expression 36 may satisfy the range of 0<tan(DFOV/2)/|D_inf|<0.5.

$$0<\tan(DFOV/2)/|D\_macro|<0.5 \qquad \text{[Conditional Expression 37]}$$

In Conditional Expression 37, DFOV refers to twice the angle between the light incident toward the maximum image height from the object side and the optical axis, and D_macro refers to a value obtained by dividing 1000 mm by the focal length of the fourth lens 400 at an object distance of 10 cm. In addition, Conditional Expression 37 may satisfy the range of 0<tan(DFOV/2)/|D_macro|<0.2.

$$1.5<G1<1.7 \qquad \text{[Conditional Expression 38]}$$

In Conditional Expression 38, G1 refers to the refractive index of the material of the first lens 100. In addition, G1 may refer to a refractive index of the first lens 100 at a wavelength of 587 nm. In addition, Conditional Expression 38 may satisfy the range of 1.53<G1<1.65.

$$20 < V1 < 60 \quad \text{[Conditional Expression 39]}$$

In Conditional Expression 39, v1 refers to the Abbe number of the first lens 100. In addition, Conditional Expression 39 may satisfy the range of 21<V1<58.

$$0 < |L1R2|/|L1R1| < 1 \quad \text{[Conditional Expression 40]}$$

In Conditional Expression 40, L1R2 refers to the radius of curvature of the image side surface of the first lens 100, and L1R1 refers to the radius of curvature of the object side surface of the first lens 100. In addition, Conditional Expression 40 may satisfy the range of 0<|L1R2|/|L1R1|<0.5.

$$0.7 < TTL/imgH < 1.3 \quad \text{[Conditional Expression 41]}$$

In Conditional Expression 41, TTL refers to the distance from the object side surface of the first lens 100 to the image plane on the optical axis, and imgH refers to the diagonal length of the image plane of the image sensor 800. In addition, imgH may mean twice the distance from the optical axis of the image plane to the maximum image height in the vertical direction. Also, imgH may be equal to the diagonal length of the effective area 810 of the image sensor 800. In addition, Conditional Expression 41 may satisfy the range of 0.5<TTL/imgH<1. In addition, Conditional Expression 41 may satisfy the range of 0.5<TTL/imgH<1.5.

$$0.5 < F\_inf/TTL < 1.5 \quad \text{[Conditional Expression 42]}$$

In Conditional Expression 42, F_inf refers to the total focal length at the object distance infinity, and TTL refers to the distance from the object side surface of the first lens 100 to the image plane on the optical axis. In addition, Conditional Expression 42 may satisfy the range of 0.6<F_inf/TTL<1.0.

$$0.5 < F\_macro/TTL < 1 \quad \text{[Conditional Expression 43]}$$

In Conditional Expression 43, F_macro refers to the total focal length at an object distance of 10 cm, and TTL refers to the distance from the object side surface of the first lens 100 to the image plane on the optical axis. In addition, Conditional Expression 43 may satisfy the range of 0.6<F_macro/TTL<0.8.

$$0.5 < F\_inf/f1 < 2 \quad \text{[Conditional Expression 44]}$$

In Conditional Expression 44, F_inf refers to the total focal length at the object distance infinity, and f1 refers to the focal length of the first lens 100. In addition, Conditional Expression 44 may satisfy a range of 0.7<F_inf/f1<1.5.

$$0.5 < F\_macro/f1 < 2 \quad \text{[Conditional Expression 45]}$$

In Conditional Expression 45, F_macro refers to the total focal length at an object distance of 10 cm, and f1 refers to the focal length of the first lens 100. In addition, Conditional Expression 45 may satisfy the range of 0.65<F_macro/f1<1.5.

$$0.2 < F\_inf/|f2| < 3 \quad \text{[Conditional Expression 46]}$$

In Conditional Expression 46, F_inf refers to the total focal length at the object distance infinity, and f2 refers to the focal length of the second lens 200. In addition, Conditional Expression 46 may satisfy the range of 0.4<F_inf/|f2|<2.

$$0.2 < F\_macro/|f2| < 2.0 \quad \text{[Conditional Expression 47]}$$

In Conditional Expression 47, F_macro refers to the total focal length at an object distance of 10 cm, and f2 refers to the focal length of the second lens 200. In addition, Conditional Expression 47 may satisfy the range of 0.4<F_macro/|f2|<1.8.

$$1 < THlg1/THlg2 < 2 \quad \text{[Conditional Expression 48]}$$

In Conditional Expression 48, THlg1 refers to the thickness of the first lens group on the optical axis (for example, the distance from the object side surface of the first lens 100 to the image side surface of the third lens 300 on the optical axis), and THlg2 refers to the thickness of the second lens group on the optical axis (for example, the distance from the object side surface of the fifth lens 500 to the image side surface of the sixth lens 600 on the optical axis). In addition, Conditional Expression 48 may satisfy the range of 1<THlg1/THlg2<1.5.

$$G2 > G1 \quad \text{[Conditional Expression 49]}$$

In Conditional Expression 49, G1 refers to the refractive index of the material of the first lens 100, and G2 refers to the refractive index of the material of the second lens 200. In addition, G1 may refer to the refractive index of the first lens 100 at a wavelength of 587 nm, G2 may refer to the refractive index of the second lens 200 at a wavelength of 587 nm.

$$|L2R2| < |L2R1| \quad \text{[Conditional Expression 50]}$$

In Conditional Expression 50, L2R2 refers to the radius of curvature of the image side surface of the second lens 200, and L2R1 refers to the radius of curvature of the object side surface of the second lens 200.

$$0.5 < F/TTL < 1.0 \quad \text{[Conditional Expression 51]}$$

In Conditional Expression 51, F refers to the total effective focal length of the entire optical system, that is, the first lens 100 to the sixth lens 600, and TTL refers to the distance from the object side surface of the first lens 100 to the image plane on the optical axis. In addition, Conditional Expression 51 may satisfy the range of 0.5<F/TTL<0.8.

$$L2R2/L3R1 < 1 \quad \text{[Conditional Expression 52]}$$

In Conditional Expression 52, L2R2 refers to the radius of curvature of the image side surface of the second lens 200, and L3R1 refers to the radius of curvature of the object side surface of the third lens 300. In addition, Conditional Expression 52 may satisfy the range of 0<L2R2/L3R1<0.6.

$$SAG5 > 0 \quad \text{[Conditional Expression 53]}$$

In Conditional Expression 53, SAG refers to the ratio of the intersection point on the optical axis C, where the vertical line drawn from the corresponding region of the lens surface of the lens toward the optical axis C meets, and the vertex of the lens. In addition, SAG5 refers to the SAG value at the position P of 80% of the effective diameter of the fifth lens 500. That is, when the vertical line is drawn toward the optical axis C from the end region, which is the effective diameter of the fifth lens 500, the intersection point with the optical axis C may be located more toward object side direction than the vertex of the object side surface of the fifth lens 500, and when the vertical line is drawn toward the optical axis C from the location P, which is 80% of the effective diameter of the fifth lens 500, the intersection point with the optical axis C may be located more toward image side direction than the vertex of the object side surface of the fifth lens 500

$$0 < THlg1/D\_inf < 2 \quad \text{[Conditional Expression 54]}$$

In Conditional Expression 54, THlg1 refers to the thickness of the first lens group on the optical axis (for example, the distance from the object side surface of the first lens 100 to the image side surface of the third lens 300 on the optical axis), and D_inf refers to a value obtained by dividing 1000 mm by the focal length of the fourth lens 400 at the object distance infinity. In addition, Conditional Expression 54 may satisfy the range of 0.3<THlg1/|D_inf|<1.5.

$0<THlg2/|D\_inf|<1.5$ [Conditional Expression 55]

In Conditional Expression 55, THlg2 refers to the thickness of the second lens group on the optical axis (for example, the distance from the object side surface of the fifth lens 500 to the image side surface of the sixth lens 600 on the optical axis), and D_inf refers to a value obtained by dividing 1000 mm by the focal length of the fourth lens 400 at object distance infinity. In addition, Conditional Expression 55 may satisfy the range of 0.3<THlg2/|D_inf|<1.0.

$0<THlg1/|D\_macro|<0.5$ [Conditional Expression 56]

In Conditional Expression 56, THlg1 refers to the thickness of the first lens group on the optical axis (for example, the distance from the object side surface of the first lens 100 to the image side surface of the third lens 300 on the optical axis), and D_macro refers to a value obtained by dividing 1000 mm by the focal length of the fourth lens 400 at an object distance of 10 cm. In addition, Conditional Expression 56 may satisfy the range of 0<THlg1/|D_macro|<0.2.

$0<THlg2/|D\_macro|<0.5$ [Conditional Expression 57]

In Conditional Expression 57, THlg2 refers to the thickness of the second lens group on the optical axis (for example, the distance from the object side surface of the fifth lens 500 to the image side surface of the sixth lens 600 on the optical axis), and D_macro refers to a value obtained by dividing 1000 mm by the focal length of the fourth lens 400 at an object distance of 10 cm. In addition, Conditional Expression 57 may satisfy the range of 0<THlg2/|D_macro|<0.2.

$0.5<TTL/Fg1<2$ [Conditional Expression 58]

In Conditional Expression 58, TTL refers to the distance from the object side surface of the first lens 100 to the image plane on the optical axis, and Fg1 refers to the combined focal length of the first lens group (for example, from the first lens 100 to the third lens 300). In addition, Conditional Expression 58 may satisfy the range of 0.8<TTL/Fg1<1.5.

$0<TTL/|Fg2|<0.5$ [Conditional Expression 59]

In Conditional Expression 59, TTL refers to the distance from the object side surface of the first lens 100 to the image plane on the optical axis, and Fg2 refers to the combined focal length of the second lens group (for example, from the fifth lens 500 to the sixth lens 600). In addition, Conditional Expression 59 may satisfy the range of 0<TTL/|Fg2|<0.3.

$0<L2R2/|L2R1|<1$ [Conditional Expression 60]

In Conditional Expression 60, L2R2 refers to the radius of curvature of the image side surface of the second lens 200, and L2R1 refers to the radius of curvature of the object side surface of the second lens 200. Also, Conditional Expression 60 may satisfy the range of 0<L2R2/|L2R1|<0.5.

$THI>0.5$ [Conditional Expression 61]

In Conditional Expression 61, THI refers to the optical axis distance from the image side surface of the third lens 300 to the object side surface of the fifth lens 500. That is, the distance between the image side surface of the third lens 300 and the object side surface of the fifth lens 500 may be greater than 0.5 mm.

$THI/TTL>0.1$ [Conditional Expression 62]

In Conditional Expression 62, THI refers to the distance from the image side surface of the third lens 300 to the object side surface of the fifth lens 500, and TTL refers to the distance from the object side surface of the first lens 100 to the image plane on the optical axis. That is, it means that the ratio of the distance between the image side surface of the third lens 300 and the object side surface of the fifth lens 500 with respect to the distance between the object side surface of the first lens 100 and the image sensor 800 may be greater than 0.1.

$THI/(Y \times 2)>0.1$ [Conditional Expression 63]

In Conditional Expression 63, THI refers to the distance from the image side surface of the third lens 300 to the side surface of the fifth lens 500 object, and Y refers to the distance from the optical axis C of the image sensor 800 to the maximum image height in the vertical direction. That is, it means that the ratio of the distance between the image side surface of the third lens 300 and the object side surface of the fifth lens 500 to twice the image height may be greater than 0.1.

$0.5<TTL/(Y \times 2)<1.5$ [Conditional Expression 64]

In Conditional Expression 64, TTL refers to the distance from the object side surface of the first lens 100 to the image plane on the optical axis, and Y refers to the distance from the optical axis C of the image sensor 800 to the maximum image height in the vertical direction. That is, it means that the ratio of the distance between the object side surface of the first lens 100 and the image sensor 800 to twice the image height may be between 0.5 and 1.5.

$R5/R6<1$ [Conditional Expression 65]

In Conditional Expression 65, R5 refers to the radius of the image side surface of the second lens 200, and R6 refers to the radius of the object side surface of the third lens 300. That is, it means that the ratio of the radius of the image side surface of the second lens 200 to the radius of the object side surface of the third lens 300 may be less than one.

The aspheric surface mentioned below can be obtained from Equation 1. E used for conic constant k and aspheric coefficients A, B, C, D, E, and F, followed by a number, represents a power of 10. For example, E+01 represents $10^1$, and E-02 represents $10^{-2}$.

$$z = \frac{cY^2}{1-\sqrt{1-(1-K)c^2Y^2}} + AY^4 + BY^4 + CY^4 + DY^4 + EY^4 + FY^4 + \ldots \qquad [Equation\ 1]$$

Here, z refers to the distance rom the vertex of the lens to the optical axis direction. c refers to the fundamental curvature of the lens. Y refers to the distance in the direction perpendicular to the optical axis. K refers to the conic constant. A, B, C, D, and E represent aspheric coefficients.

TABLE 1

| Surface | Radius | Thickness | Index | Abbe # |
|---|---|---|---|---|
| 1* | 5.9128 | 0.3270 | 1.6397 | 23.5 |
| 2* | −1.7386 | 0.0200 | | |
| Stop | infinity | 0.0100 | | |
| 3* | 4.9099 | 0.2000 | 1.6714 | 19.2 |
| 4* | 0.8834 | 0.0634 | | |

TABLE 1-continued

| Surface | Radius | Thickness | Index | Abbe # |
|---|---|---|---|---|
| 5* | 1.5907 | 0.3990 | 1.5441 | 56.1 |
| 6* | -14.1057 | 0.1200 | | |
| 7 | infinity | | | |
| 8 | infinity | | | |
| 9 | variable | | | |
| 10 | infinity | | | |
| 11 | infinity | 0.2573 | | |
| 12* | -87.3623 | 0.4203 | 1.5441 | 56.1 |
| 13* | -1.0332 | 0.0691 | | |
| 14* | 1.6653 | 0.3200 | 1.5343 | 55.6 |
| 15* | 0.5487 | 0.3615 | | |
| filter | infinity | 0.1100 | 1.523 | 54.5 |
| Image | infinity | 0.5741 | | |

Table 1 shows the surface number (Surface), the radius of curvature (Radius), the thickness of the center of each lens or the distance between the lens surfaces (THIckness), the index of refraction (Index), and the Abbe number (Abbe) of the imaging lens according to the first exemplary embodiment of the present invention. At this time, the unit of curvature radius and thickness or distance may be mm.

TABLE 2

| | 1* | 2* | 3* | 4* | 5* |
|---|---|---|---|---|---|
| K | 0 | -0.69321 | 0 | -0.46422 | -7.03203 |
| A | 0.000546 | 1.522315 | 0.636071 | -1.41188 | -0.28429 |
| B | -0.44903 | -10.4344 | -5.45276 | 8.539791 | 3.373035 |
| D | 7.893625 | 70.11115 | 37.8362 | -50.0726 | -17.7201 |
| E | -60.2494 | -351.643 | -216.305 | 203.957 | 65.84673 |
| F | 276.4116 | 1167.664 | 813.9539 | -567.055 | -166.892 |
| G | -788.938 | -2393.51 | -1879.42 | 1009.33 | 271.4156 |
| H | 1364.139 | 2724.942 | 2404.017 | -1042.15 | -258.952 |
| I | -1305.14 | -1314.72 | -1306.45 | 475.7661 | 111.9642 |
| J | 528.9683 | 0 | 0 | 0 | 0 |

| | 6* | 12* | 13* | 14* | 15* |
|---|---|---|---|---|---|
| K | 0 | 0 | -2.97372 | -21.0271 | -4.01966 |
| A | -0.12993 | 0.108564 | 0.442689 | -0.62 | -0.384 |
| B | 0.239266 | 0.34132 | -1.49811 | -0.712277 | 0.502574 |
| D | -2.32627 | -2.93367 | 4.23278 | -0.7357 | -0.48059 |
| E | 16.03216 | 8.6351 | -8.4116 | 0.893787 | 0.31687 |
| F | -62.1712 | -13.5715 | 11.57459 | -1.06267 | -0.1404 |
| G | 142.0093 | 12.05839 | -10.2391 | 0.981293 | 0.040106 |
| H | -168.769 | -5.7394 | 5.433018 | -0.56871 | -0.00697 |
| I | 80.82503 | 1.127029 | -1.56645 | 0.17663 | 0.000665 |
| J | 0 | 0 | 0.188501 | 0.02237 | -2.75E - 05 |

Table 2 shows the values of aspheric coefficients and conic constants (k) of each lens surface of the imaging lens according to the first exemplary embodiment of the present invention.

TABLE 3

| | First exemplary embodiment |
|---|---|
| imgH | 4.5 |
| F_inf | 2.786 |
| F_macro | 2.67 |
| D_inf | 2.00 |
| D_macro | 19.23 |
| Fg1 | 3.833 |
| Fg2 | 16.534 |
| TTL | 3.937 |
| Fno | 2.264 |
| DFOV | 76.33 |
| G1 | 1.6397 |
| V1 | 23.52 |

TABLE 3-continued

| | First exemplary embodiment |
|---|---|
| d1 | 1.0637 |
| d2 | 0.734 |
| THLg1 | 1.0194 |
| THLg2 | 0.809 |
| f1 | 2.115 |
| f2 | -1.618 |
| L1R1 | 5.9128 |
| L2R2 | 0.8834 |
| L1R2 | -1.7386 |
| L3R1 | 1.5907 |
| F | 2.78 |
| THI | 1.064 |
| Y | 2.25 |
| F/TTL | 0.705 |
| TTL/(Y*2) | 0.875 |
| R5 | 0.8834 |
| R6 | 1.5907 |
| SAG5 | 0.0268 |

Table 3 shows the characteristics of the imaging lens according to the first exemplary embodiment of the present invention.

imgH refers to the diagonal length of the image plane of the image sensor 800, F_inf refers to the total focal length at the object distance infinity, F_macro refers to the total focal length at the object distance of 10 cm, D_inf refers to the value obtained by dividing 1000 mm by the focal length of the fourth lens 400 at the object distance infinity, D_macro refers to a value obtained by dividing 1000 mm by the focal length of the fourth lens 400 at the object distance of 10 cm, Fg1 refers to the composite focal length of the first lens group (for example, from the first lens 100 to the third lens 300), Fg2 refers to the composite focal length of the second lens group (for example, from the fifth lens 500 to the sixth lens 600), TTL refers to the distance from the object side surface of the first lens 100 to the image plane (imaging surface) on the optical axis, Fno refers to the F-number of the whole optical system, DFOV refers to twice the angle between the light incident toward the maximum image height from the object side and the optical axis, G1 refers to the refractive index of the material of the first lens 100, and G2 refers to the refractive index of the material of the second lens 200, v1 refers to the Abbe number of the first lens 100, d1 refers to the distance between the first lens group and the second lens group on the optical axis (for example, the distance from the image side surface of the third lens 300 to the object side surface of the fifth lens 500 on the optical axis), d2 refers to the thickness of the fourth lens 400 on the optical axis, THlg1 refers to the thickness of the first lens group on the optical axis (for example, the distance from the object side surface of the first lens 100 to the image side surface of the third lens 300 on the optical axis), THlg2 refers to the thickness of the second lens group on the optical axis (for example, the distance from the object side surface of the fifth lens 500 to the image side surface of the sixth lens 600 on the optical axis), f1 refers to the focal length of the first lens 100, f2 refers to the focal length of the second lens 200, L1R1 refers to the radius of curvature of the object side surface of the first lens 100, L2R2 refers to a radius of curvature of an image side surface of the second lens 200, L1R2 refers to the radius of curvature of the image side surface of the first lens 100, L3R1 refers to the radius of curvature of the object side surface of the third lens 300, SAG refers to the ratio of the intersection point on the optical axis C, where the vertical line drawn from the corresponding region of the lens surface of the lens toward the optical axis C meets, and the vertex of the lens, F refers to the total effective focal length of the entire optical system, that is, the first lens 100 to the sixth lens 600, THI refers to the distance from the image side surface of the third lens 300 to the object side surface of the fifth lens 500, Y refers to the distance from the optical axis C of the image sensor 800 to the maximum image height in the vertical direction, R5 refers to the radius of the image side surface of the second lens 200, R6 refers to the radius of the object side surface of the third lens 300, and SAG5 refers to the SAG value at the position P of 80% of the effective diameter of the fifth lens 500. At this time, the unit of imgH, TTL, Fno, F_inf, F_macro, Fg1, Fg2, d1, d2, THlg1, THlg2, f1, f2, L1R1, L2R2, L1R2 may be mm.

Hereinafter, a concept of a diagonal field of view (DFOV) of an imaging lens according to the present exemplary embodiment will be described with reference to the drawings.

Figure 6:
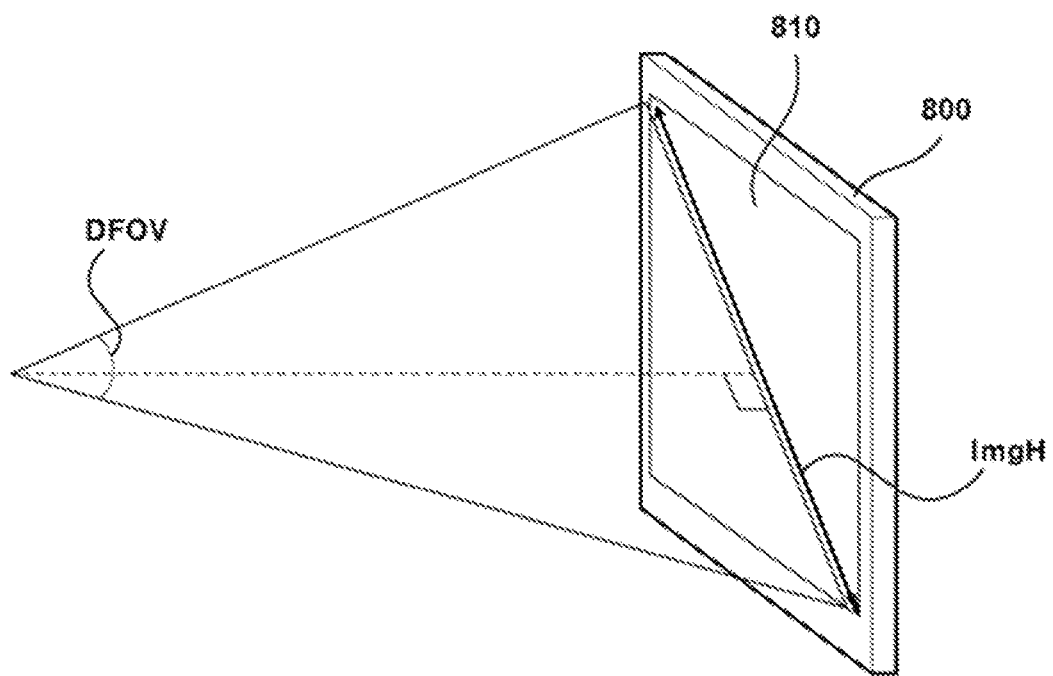
FIG. 6 is a conceptual diagram of a diagonal field of view (DFOV) of an imaging lens according to the present exemplary embodiment.

FIG. 6 is a conceptual diagram of a diagonal field of view (DFOV) of an imaging lens according to the present exemplary embodiment.

At this time, the field of view (FOV) may be a diagonal field of view (DFOV). The diagonal angle of view (DFOV) may be distinguished from the horizontal field of view (HFOV) and the vertical field of view (VFOV). For example, the horizontal field of view (HFOV) may be 0.8 times the diagonal field of view (DFOV). In addition, the field of view (FOV) may be distinguished from the half field of view (HFOV). The field of view (FOV) refers to the diameter of the imaginary circle connecting four vertices of the image sensor, and the half field of view (HFOV) may refer to the radius of the imaginary circle mentioned. That is, the field of view (FOV) may be twice the half field of view (HFOV).

Diagonal angle of view (DFOV) can be calculated using the following Equation.

$$DFOV = 2 * \arctan(imgH/(2*F))$$ [Equation]

Here, imgH refers to the diagonal length of the image plane of the image sensor 800, and F refers to the effective focal length of the optical system. In addition, imgH may mean twice the distance from the optical axis of the image plane to the maximum image height in the vertical direction. Also, imgH may be equal to the diagonal length of the effective area 810 of the image sensor 800.

Hereinafter, a configuration of an imaging lens according to a second exemplary embodiment of the present invention will be described with reference to the drawings.

Figure 2:
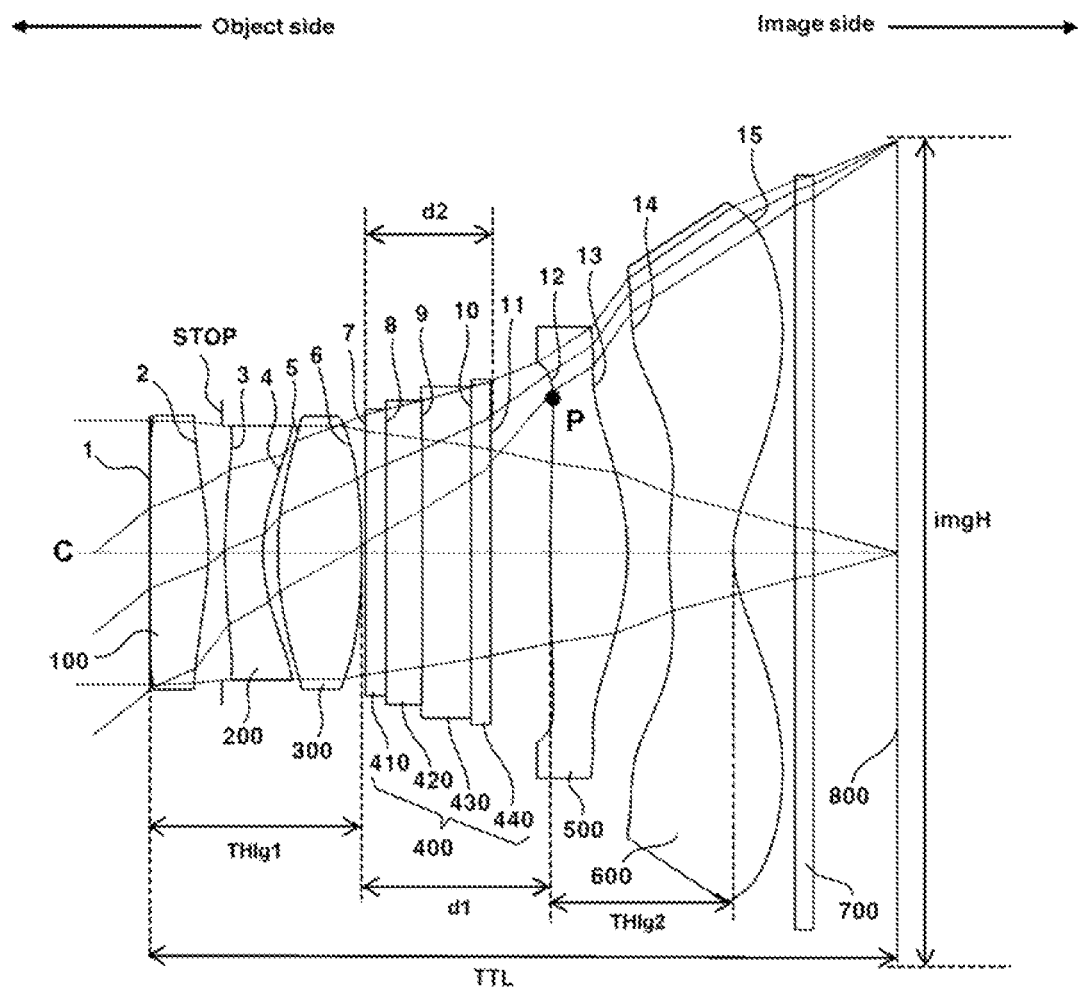
FIG. 2 is a configuration diagram of an imaging lens according to a second exemplary embodiment of the present invention.

FIG. 2 is a configuration diagram of an imaging lens according to a second exemplary embodiment of the present invention.

An imaging lens according to the second exemplary embodiment of the present invention may comprise a plurality of lenses. The imaging lens may comprise six lenses. The imaging lens may comprise a first lens 100, a second lens 200, a third lens 300, a fourth lens 400, a fifth lens 500, a sixth lens 600, and a aperture STOP. It may comprise. However, in the imaging lens according to the second exemplary embodiment, any one or more of the first lens 100, the second lens 200, the third lens 300, the fourth lens 400, the fifth lens 500, the sixth lens 600, and aperture STOP may be omitted. The imaging lens may be disposed with the first lens 100, the aperture STOP, the second lens 200, the third lens 300, the fourth lens 400, the fifth lens 500, and the sixth lens 600 sequentially in order from the object side to the image side. The imaging lens according to the second exemplary embodiment may be composed of five or less lenses. Alternatively, the imaging lens according to the second exemplary embodiment may be composed of seven or more lenses.

In another exemplary embodiment, one or more of another lens, a flat plate, and an optical member may be added between the first lens 100 and the sixth lens 600. In addition, at least one of another lens, a flat plate, and an optical member may be added in front of the first lens 100 or behind the sixth lens 600. In addition, any one or more of another lens, a flat plate, and an optical member may be added between the aperture STOP and the lens, between the lens and a filter 700, and between the filter 700 and an image sensor 800. At this time, filter 700 may be a flat lens. The refractive power of the flat lens may be '0'. There may be no refractive power of the flat lens. In addition, a filter layer may be disposed between the aperture STOP and the lens, between the lens and the filter 700, and between the filter 700 and the image sensor 800. In this case, the filter layer may be coated to become a filter.

The first lens 100 according to the second exemplary embodiment may have a positive refractive power. The object side surface of the first lens 100 may be concave. The first lens 100 may be formed to concave the object side surface on the optical axis. The first lens 100 may comprise an object side surface having a concave shape. The first lens 100 may comprise an object side surface having a concave shape on the optical axis. The image side surface of the first lens 100 may be convex. The first lens 100 may have a convex image side surface on the optical axis. The first lens 100 may comprise an image side surface having a convex shape. The first lens 100 may comprise an image side surface having a convex shape on the optical axis. The first lens 100 may be formed in a meniscus shape in which an image side surface is convex. The first lens 100 may be formed in a meniscus shape in which an image side surface is convex on an optical axis. The object side surface or the image side surface of the first lens 100 may comprise at least one inflection point.

The radius of curvature of the object side surface of the first lens 100 may be negative. The radius of curvature at the optical axis of the object side surface of the first lens 100 may be negative. The radius of curvature of the image side surface of the first lens 100 may be negative. The radius of curvature of the image side surface in the optical axis of the first lens 100 may be negative. The absolute value of the radius of curvature of the object side surface of the first lens 100 may be greater than the absolute value of the radius of curvature of the image side surface of the first lens 100. The first lens 100 may be a solid lens.

The imaging lens according to the second exemplary embodiment uses the same reference numerals for the imaging lens and the radius of curvature, the distance between the center thickness or lens surface of each lens, the refractive index, the Abbe number, and the same parts according to the first exemplary embodiment, and the description thereof will be omitted. For the omitted portions of the description of the imaging lens according to the second exemplary embodiment, the description of the imaging lens according to the first exemplary embodiment may be applied by analogy.

TABLE 4

| Surface | Radius | Thickness | Index | Abbe # |
|---|---|---|---|---|
| 1* | −212.382 | 0.342 | 1.6397 | 23.5 |
| 2* | −1.707 | 0.080 | | |
| Stop | infinity | 0.020 | | |
| 3* | 6.615 | 0.220 | 1.6714 | 19.2 |
| 4* | 1.083 | 0.087 | | |
| 5* | 1.982 | 0.491 | 1.5441 | 56.1 |
| 6* | −4.738 | 0.122 | | |
| 7 | infinity | | | |
| 8 | infinity | | | |
| 9 | variable | | | |
| 10 | infinity | | | |
| 11 | infinity | 0.299 | | |
| 12* | −343.748 | 0.448 | 1.5441 | 56.1 |
| 13* | −1.549 | 0.242 | | |
| 14* | 2.582 | 0.374 | 1.5343 | 55.6 |
| 15* | 0.791 | 0.361 | | |
| filter | infinity | 0.110 | 1.523 | 54.5 |
| Image | infinity | 0.489 | | |

Table 4 shows the surface number (Surface), the radius of curvature (Radius), the thickness of the center of each lens or the distance between the lens surfaces (THIckness), the index of refraction (Index), and the Abbe number (Abbe) of the imaging lens according to the second exemplary embodiment of the present invention. At this time, the unit of curvature radius and thickness or distance may be mm.

TABLE 5

| | 1* | 2* | 3* | 4* | 5* |
|---|---|---|---|---|---|
| K | 0.00000000 | 0.50531824 | 0.00000000 | −0.00750068 | −11.06086907 |
| A | 0.00874882 | 0.74970732 | 0.36279376 | −0.65627170 | −0.06176314 |
| B | 0.06347018 | −2.65329340 | −2.90504335 | 0.90412156 | 0.65657782 |
| D | −0.13412609 | 9.96096414 | 15.73576798 | −0.20963436 | −4.38823614 |
| E | 0.47945215 | −26.95094130 | −60.86378905 | −7.42623850 | 24.58823636 |
| F | −0.88141176 | 47.99050222 | 151.01892355 | 26.73408099 | −91.43813038 |
| G | 0.55882014 | −52.52802398 | −227.97582374 | −47.45116024 | 209.75233729 |
| H | 0.25979111 | 31.75251989 | 189.32130939 | 46.18370819 | −286.25632509 |
| I | −0.33609788 | −8.08332994 | −66.15368187 | −23.54867709 | 212.56346819 |
| J | 0.00000000 | 0.00000000 | 0.00000000 | 5.17346752 | −65.87952999 |

| | 6* | 12* | 13* | 14* | 15* |
|---|---|---|---|---|---|
| K | 9.45638469 | 0.00000000 | −1.72326948 | −9.47414715 | −3.46797875 |
| A | −0.05266909 | 0.15043847 | 0.27545909 | −0.44643426 | −0.31682448 |
| B | −0.37054788 | −0.56973460 | −0.77093426 | 0.12731198 | 0.33780047 |
| D | 3.62232399 | 1.55915408 | 1.92422136 | 0.41729025 | −0.25636651 |
| E | −20.31825873 | −3.20023113 | −3.36437980 | −0.78968043 | 0.13510579 |
| F | 68.17961274 | 4.55881260 | 3.95475114 | 0.73005105 | −0.04861583 |
| G | −140.50405356 | −4.22918344 | −2.91028151 | −0.38739052 | 0.01156648 |
| H | 174.33159141 | 2.39830576 | 1.26803863 | 0.11848916 | −0.00172342 |
| I | −119.45394740 | −0.75202587 | −0.29889496 | −0.01945233 | 0.00014485 |
| J | 34.73034545 | 0.09770009 | 0.02941719 | 0.00133039 | −0.00000525 |

Table 5 shows the values of the aspheric coefficients and conic constants (k) of each lens surface of the imaging lens according to the second exemplary embodiment of the present invention.

TABLE 6

| | Second exemplary embodiment |
|---|---|
| imgH | 4.98 |
| F_inf | 2.973 |
| F_macro | 2.874 |
| D_inf | 2.00 |
| D_macro | 13.65 |
| Fg1 | 3.863 |
| Fg2 | 99.723 |
| TTL | 4.372 |
| Fno | 1.796 |
| DFOV | 78.8 |
| G1 | 1.6397 |
| V1 | 23.52 |
| d1 | 1.107 |
| d2 | 0.734 |
| THLg1 | 1.24 |
| THLg2 | 1.064 |
| f1 | 2.662 |
| f2 | −1.937 |
| L1R1 | −212.382 |
| L2R2 | 1.0832 |
| L1R2 | −1.7074 |
| L3R1 | 1.982 |
| F | 2.97 |
| THI | 1.107 |
| Y | 2.5 |
| F/TTL | 0.68 |
| TTL/(Y*2) | 0.874 |
| R5 | 1.083 |
| R6 | 1.982 |
| SAG5 | 0.0133 |

Table 6 shows the characteristics of the imaging lens according to the second exemplary embodiment of the present invention.

Hereinafter, a configuration of an imaging lens according to a third exemplary embodiment of the present invention will be described with reference to the drawings.

Figure 3:
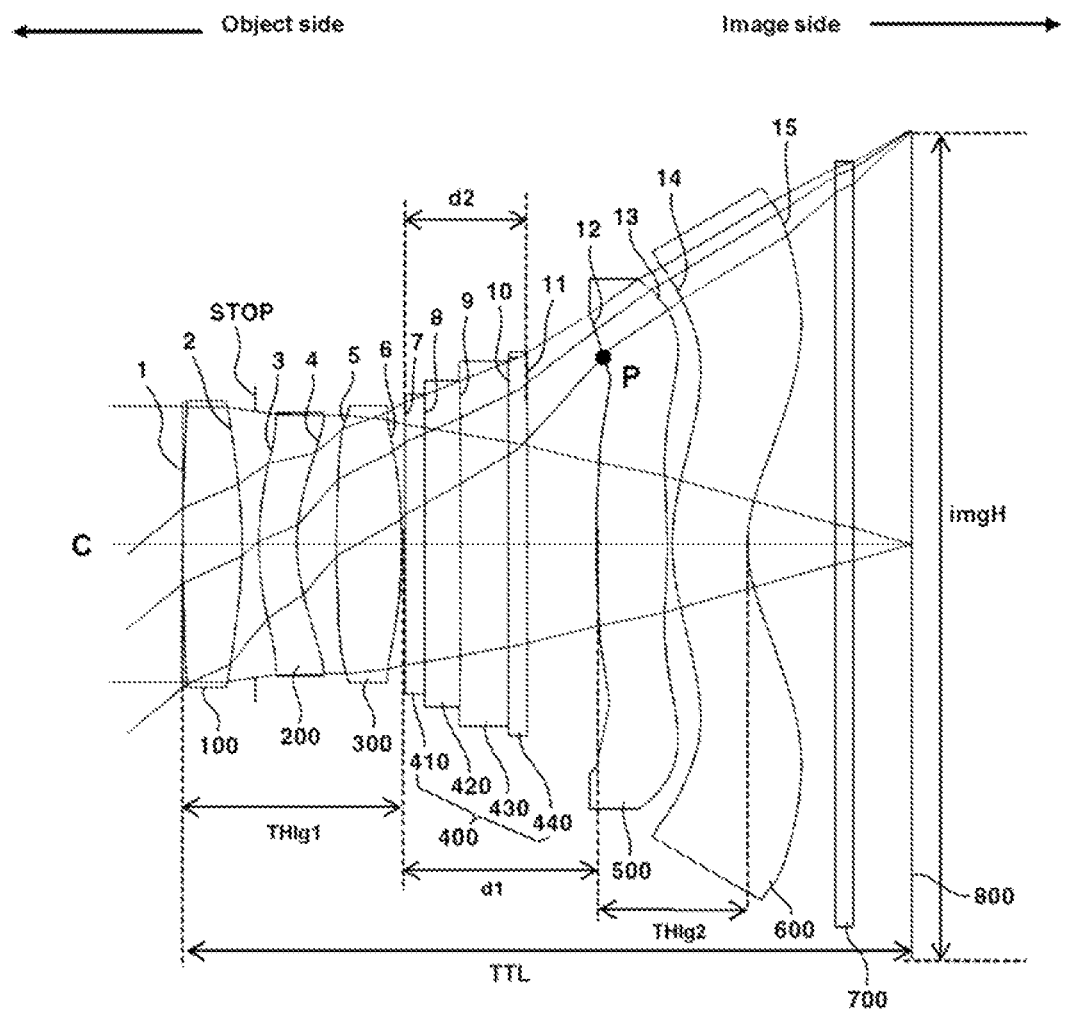
FIG. 3 is a configuration diagram of an imaging lens according to a third exemplary embodiment of the present invention.

FIG. 3 is a configuration diagram of an imaging lens according to a third exemplary embodiment of the present invention.

An imaging lens according to the third exemplary embodiment of the present invention may comprise a plurality of lenses. The imaging lens may comprise six lenses. The imaging lens may comprise a first lens 100, a second lens 200, a third lens 300, a fourth lens 400, a fifth lens 500, a sixth lens 600, and a aperture STOP. It may comprise. However, in the imaging lens according to the third exemplary embodiment, any one or more of the first lens 100, the second lens 200, the third lens 300, the fourth lens 400, the fifth lens 500, the sixth lens 600, and aperture STOP may be omitted. The imaging lens may be disposed with the first lens 100, the aperture STOP, the second lens 200, the third lens 300, the fourth lens 400, the fifth lens 500, and the sixth lens 600 sequentially in order from the object side to the image side. The imaging lens according to the second exemplary embodiment may be composed of five or less lenses. Alternatively, the imaging lens according to the third exemplary embodiment may be composed of seven or more lenses.

In another exemplary embodiment, one or more of another lens, a flat plate, and an optical member may be added between the first lens 100 and the sixth lens 600. In addition, at least one of another lens, a flat plate, and an optical member may be added in front of the first lens 100 or behind the sixth lens 600. In addition, any one or more of another lens, a flat plate, and an optical member may be added between the aperture STOP and the lens, between the lens and a filter 700, and between the filter 700 and an image sensor 800. At this time, filter 700 may be a flat lens. The refractive power of the flat lens may be '0'. There may be no refractive power of the flat lens. In addition, a filter layer may be disposed between the aperture STOP and the lens, between the lens and the filter 700, and between the filter 700 and the image sensor 800. In this case, the filter layer may be coated to become a filter.

The third lens 300 may have a refractive power of positive. Both surfaces of the third lens 300 may be convex. Both surfaces of the third lens 300 may be convex on the optical axis. The object side surface of the third lens 300 may be convex. The third lens 300 may have a convex object side surface on the optical axis. The third lens 300 may comprise an object side surface having a convex shape. The third lens 300 may comprise an object side surface having a convex shape on the optical axis. The image side surface of the third lens 300 may be convex. The third lens 300 may have a convex image side surface on the optical axis. The third lens 300 may comprise an image side surface having a convex shape. The third lens 300 may comprise an image side surface having a convex shape on the optical axis. The object side surface or the image side surface of the third lens 300 may comprise at least one inflection point.

The radius of curvature of the object side surface of the third lens 300 may be positive. The radius of curvature of the object side surface of the third lens 300 on the optical axis may be positive. The radius of curvature of the image side surface of the third lens 300 may be negative. The radius of curvature of the image side surface of the third lens 300 on the optical axis may be negative. The absolute value of the radius of curvature of the object side surface of the third lens 300 may be greater than the absolute value of the radius of curvature of the image side surface of the third lens 300. The third lens 300 may be a solid lens.

The imaging lens according to the third exemplary embodiment uses the same reference numerals for the imaging lens and the radius of curvature, the distance between the center thickness or lens surface of each lens, the refractive index, the Abbe number, and the same parts according to the first exemplary embodiment, and the description thereof will be omitted. For the omitted portions of the description of the imaging lens according to the third exemplary embodiment, the description of the imaging lens according to the first exemplary embodiment may be applied by analogy.

TABLE 7

| Surface | Radius | Thickness | Index | Abbe # |
|---|---|---|---|---|
| 1* | 21.208 | 0.465 | 1.5441 | 56.1 |
| 2* | −3.379 | 0.105 | | |
| Stop | infinity | 0.026 | | |
| 3* | 3.971 | 0.300 | 1.6714 | 19.2 |
| 4* | 1.418 | 0.309 | | |
| 5* | 8.695 | 0.511 | 1.5441 | 56.1 |
| 6* | −4.794 | 0.126 | | |
| 7 | infinity | | | |
| 8 | infinity | | | |
| 9 | variable | | | |
| 10 | infinity | | | |
| 11 | infinity | 0.502 | | |
| 12* | −39.141 | 0.556 | 1.5441 | 56.1 |
| 13* | −4.119 | 0.039 | | |
| 14* | 1.718 | 0.589 | 1.6613 | 20.3 |
| 15* | 1.076 | 0.682 | | |
| filter | infinity | 0.110 | 1.523 | 54.5 |
| Image | infinity | 0.484 | | |

Table 7 shows the surface number (Surface), the radius of curvature (Radius), the thickness of the center of each lens or the distance between the lens surfaces (THIckness), the index of refraction (Index), and the Abbe number (Abbe) of the imaging lens according to the third exemplary embodiment of the present invention. At this time, the unit of curvature radius and thickness or distance may be mm.

TABLE 8

| | 1* | 2* | 3* | 4* | 5* |
|---|---|---|---|---|---|
| K | 0.000000000 | 3.339476465 | 0.000000000 | −0.036551338 | −21.070470717 |
| A | −0.008318576 | 0.095765545 | −0.116690199 | −0.280138353 | −0.039132941 |
| B | 0.040997724 | −0.051609878 | 0.142275590 | 0.294176920 | 0.003303630 |
| D | −0.135062142 | 0.054805382 | −0.206875521 | −0.406944737 | 0.151700087 |
| E | 0.255724951 | −0.062010714 | 0.143748587 | 0.361419561 | −0.332267449 |
| F | −0.263387704 | 0.037557044 | −0.076911385 | −0.218454193 | 0.472312511 |
| G | 0.138049259 | −0.009928315 | 0.014258071 | 0.054103076 | −0.323859439 |
| H | −0.029280807 | 0.000000000 | 0.000000000 | 0.000000000 | 0.082743458 |
| I | 0.00000000 | 0.0000000000 | 0.000000000 | 0.000000000 | 0.000000000 |
| J | 0.000000000 | 0.000000000 | 0.000000000 | 0.000000000 | 0.000000000 |

TABLE 8-continued

| | 6* | 12* | 13* | 14* | 15* |
|---|---|---|---|---|---|
| K | −5.483123826 | 0.000000000 | −5.162618480 | −3.735455760 | −4.363504955 |
| A | −0.039274444 | 0.156556684 | 0.211037524 | −0.088254277 | −0.033766525 |
| B | −0.000565009 | −0.131555278 | −0.156461076 | 0.043211409 | −0.011930834 |
| D | −0.011440767 | 0.082805104 | 0.131566428 | −0.038525692 | 0.017493990 |
| E | 0.111277891 | −0.046095980 | −0.104903284 | 0.035154248 | −0.009361330 |
| F | −0.169284715 | 0.017163937 | 0.055921023 | −0.021373346 | 0.002712710 |
| G | 0.133053213 | −0.003608721 | −0.018873466 | 0.007510149 | −0.000456787 |
| H | −0.036608872 | 0.000315321 | 0.003903790 | −0.001473430 | 0.000044944 |
| I | 0.000000000 | 0.000000000 | −0.000452332 | 0.000150151 | −0.000002418 |
| J | 0.000000000 | 0.000000000 | 0.000022471 | −0.000006189 | 0.000000055 |

Table 8 shows the values of the aspheric coefficients and conic constants (k) of each lens surface of the imaging lens according to the third exemplary embodiment of the present invention.

TABLE 9

| | Third exemplary embodiment |
|---|---|
| imgH | 5.868 |
| F_inf | 3.894 |
| F_macro | 3.704 |
| D_inf | 1.40 |
| D_macro | 15.74 |
| Fg1 | 4.757 |
| Fg2 | −601.916 |
| TTL | 5.712 |
| Fno | 1.803 |
| DFOV | 72.7 |
| G1 | 1.5441 |
| V1 | 56.115 |
| d1 | 1.528 |
| d2 | 0.961 |
| THLg1 | 1.716 |
| THLg2 | 1.184 |
| f1 | 5.286 |
| f2 | −6.759 |
| L1R1 | 21.2084 |
| L2R2 | 1.4176 |
| L1R2 | −3.3789 |
| L3R1 | 8.695 |
| F | 3.89 |
| THI | 1.52 |
| Y | 3.26 |
| F/TTL | 0.68 |
| TTL/(Y*2) | 0.876 |
| R5 | 1.418 |
| R6 | 8.695 |
| SAGS | 0.1148 |

Table 9 shows the characteristics of the imaging lens according to the third exemplary embodiment of the present invention.

TABLE 10

| | First exemplary embodiment | Second exemplary embodiment | Third exemplary embodiment |
|---|---|---|---|
| d1/d2 | 1.45 | 1.51 | 1.59 |
| Fg1/|Fg2| | 0.23 | 0.04 | 0.01 |
| d1/TTL | 0.27 | 0.25 | 0.27 |
| d1/imgH | 0.24 | 0.22 | 0.26 |
| d1 | 1.06 | 1.11 | 1.53 |
| THIg1/TTL | 0.26 | 0.28 | 0.30 |
| THIg2/TTL | 0.21 | 0.24 | 0.21 |
| THIg1/imgH | 0.23 | 0.25 | 0.29 |
| THIg2/imgH | 0.18 | 0.21 | 0.20 |
| THIg1/d1 | 0.96 | 1.12 | 1.12 |
| THIg1/d2 | 1.39 | 1.69 | 1.79 |
| THIg2/d1 | 0.76 | 0.96 | 0.77 |
| THIg2/d2 | 1.10 | 1.45 | 1.23 |
| TTL/|D_inf| | 1.97 | 2.19 | 4.08 |
| TTL/|D_macro| | 0.20 | 0.32 | 0.36 |
| imgH/|D_inf| | 2.25 | 2.49 | 4.19 |
| imgH/|D_macro| | 0.23 | 0.36 | 0.37 |
| F_macro/F_inf | 0.96 | 0.97 | 0.95 |
| Fno/|D_inf| | 1.13 | 0.90 | 1.29 |
| Fno/|D_macro| | 0.12 | 0.13 | 0.11 |
| Fno/d1 | 2.13 | 1.62 | 1.18 |
| Fg1/TTL | 0.97 | 0.88 | 0.83 |
| |Fg2|/TTL | 4.20 | 22.81 | 105.38 |
| Fg1/imgH | 0.85 | 0.78 | 0.81 |
| |Fg2|/imgH | 3.67 | 20.02 | 102.58 |
| f1/|L1R1| | 0.36 | 0.01 | 0.25 |
| L2R2/|f2| | 0.55 | 0.56 | 0.21 |
| Fg1/f1 | 1.81 | 1.45 | 0.90 |
| Fg1/|f2| | 2.37 | 1.99 | 0.70 |
| Fg1/|L1R1| | 0.65 | 0.02 | 0.22 |
| Fg1/L2R2 | 4.34 | 3.57 | 3.36 |
| |Fg2|/f1 | 7.82 | 37.46 | 113.87 |
| |Fg2|/|f2| | 10.22 | 51.48 | 89.05 |
| |Fg2|/|L1R1| | 2.80 | 0.47 | 28.38 |
| |Fg2|/L2R2 | 18.72 | 92.06 | 424.60 |
| tan(DFOV/2)/|D_inf| | 0.39 | 0.41 | 0.53 |
| tan(DFOV/2)/|D_macro| | 0.04 | 0.06 | 0.05 |
| G1 | 1.6397 | 1.6397 | 1.5441 |
| V1 | 23.52 | 23.52 | 56.115 |
| |L1R2|/|L1R1| | 0.29 | 0.01 | 0.16 |
| TTL/imgH | 0.87 | 0.88 | 0.97 |
| F_inf/TTL | 0.71 | 0.68 | 0.68 |
| F_macro/TTL | 0.68 | 0.66 | 0.65 |
| F_inf/f1 | 1.32 | 1.12 | 0.74 |
| F_macro/f1 | 1.26 | 1.08 | 0.70 |
| F_inf/|f2| | 1.72 | 1.53 | 0.58 |
| F_macro/|f2| | 1.65 | 1.48 | 0.55 |
| THIg1/|D_inf| | 0.51 | 0.62 | 1.23 |
| THIg2/|D_inf| | 0.40 | 0.53 | 0.85 |
| THIg1/|D_macro| | 0.05 | 0.09 | 0.11 |
| THIg2/|D_macro| | 0.04 | 0.08 | 0.08 |
| TTL/Fg1 | 1.03 | 1.13 | 1.20 |
| TTL/|Fg2| | 0.24 | 0.04 | 0.01 |
| L2R2/|L2R1| | 0.18 | 0.16 | 0.36 |

Referring to Table 10, it can be seen that the first to third embodiments of the present invention satisfy all of Conditional Expressions. In addition, the first to third embodiments of the present invention may satisfy 1.2<d1/d2<1.8, 0<Fg1/|Fg2|<0.5, and 0.1<d1/TTL<0.4. Alternatively, the first to third embodiments of the present invention may satisfy 0.1<d1/imgH<0.4, 0.8<d1<2.0, 0.1<THLg1/TTL<0.5, and 0.1<THLg2/TTL<0.5.

Alternatively, the first to third embodiments of the present invention may satisfy 0.1<THLg1/imgH<0.4, 0.1<THLg2/imgH<0.4, and 0.5<THLg1/d1<1.5. Alternatively, the first to third embodiments of the present invention may satisfy 1<THLg1/d2<2, 0.5<THLg2/d1<1.5, 1<THLg2/d2<2, and $0<TTL/|D\_inf|<8$. Alternatively, the first to third embodiments of the present invention may satisfy $0.1<TTL/|D\_macro|<0.5$, $0<imgH/|D\_inf|<8$, and $0.1<imgH/|D\_macro|<0.4$.

Alternatively, the first to third embodiments of the present invention may have $0.6<F\_macro/F\_inf<1.5$ and $0.5<Fno/|D\_inf|<2$, $0<Fno/|D\_macro|<0.4$, $0.5<Fno/d1<4$ may be satisfied. Alternatively, the first to third embodiments of the present invention may satisfy $0.5<Fg1/TTL<2$, $|Fg2|/TTL>1$, $0.5<Fg1/imgH<1.2$, $|Fg2|/imgH>1.0$. Alternatively, the first to third embodiments of the present invention may be implemented with $0 \& lt; <5$, $0<L2R2/|f2|<1$, $0.5<Fg1/f1<3.0$, $0<Fg1/|f2|<5$ can be satisfied.

Alternatively, the first to third embodiments of the present invention may satisfy $0<Fg1/|L1R1|<5$, $1<Fg1/L2R2<10$, $|Fg2|/f1>1$, and $|Fg2|/|f2|>1$. Alternatively, the first to third embodiments of the present invention may satisfy $|Fg2|/|L1R1|>0.2$, $|Fg2|/L2R2>5$, $0<\tan(DFOV/2)/|D\_inf|<0.8$, $0<\tan(DFOV/2)/|D\_macro|<0.5$, and $1.5<G1<1.7$. Alternatively, the first to third embodiments of the present invention may satisfy $20<V1<60$, $0<|L1R2|/|L1R1|<1$, $0.7<TTL/imgH<1.3$, and $0.5<F\_inf/TTL<1.5$.

Alternatively, the first to third embodiments of the present invention may satisfy $0.5<F\_macro/TTL<1$, $0.5<F\_inf/f1<2$, $0.5<F\_macro/f1<2$, $0.2<F\_inf/|f2|<3$, and $0.2<F\_macro/|f2|<2.0$. Alternatively, the first to third embodiments of the present invention may satisfy $0<THIg1/|D\_inf|<2$, $0<THIg2/|D\_inf|<1.5$, $0<THIg1/|D\_macro|<0.5$, and $0<THIg2/|D\_macro|<0.5$. Alternatively, the first to third embodiments of the present invention may satisfy $0.5<TTL/Fg1<2$, $0<TTL/|Fg2|<0.5$, and $0<L2R2/|L2R1|<1$. At this time, the unit of, imgH, TTL, Fno, F_inf, F_macro, Fg1, Fg2, d1, d2, THlg1, THlg2, f1, f2, L1R1, L2R2, and L1R2 may be mm.

Hereinafter, a camera module according to an embodiment of the present invention will be described with reference to the drawings.

Figure 7:
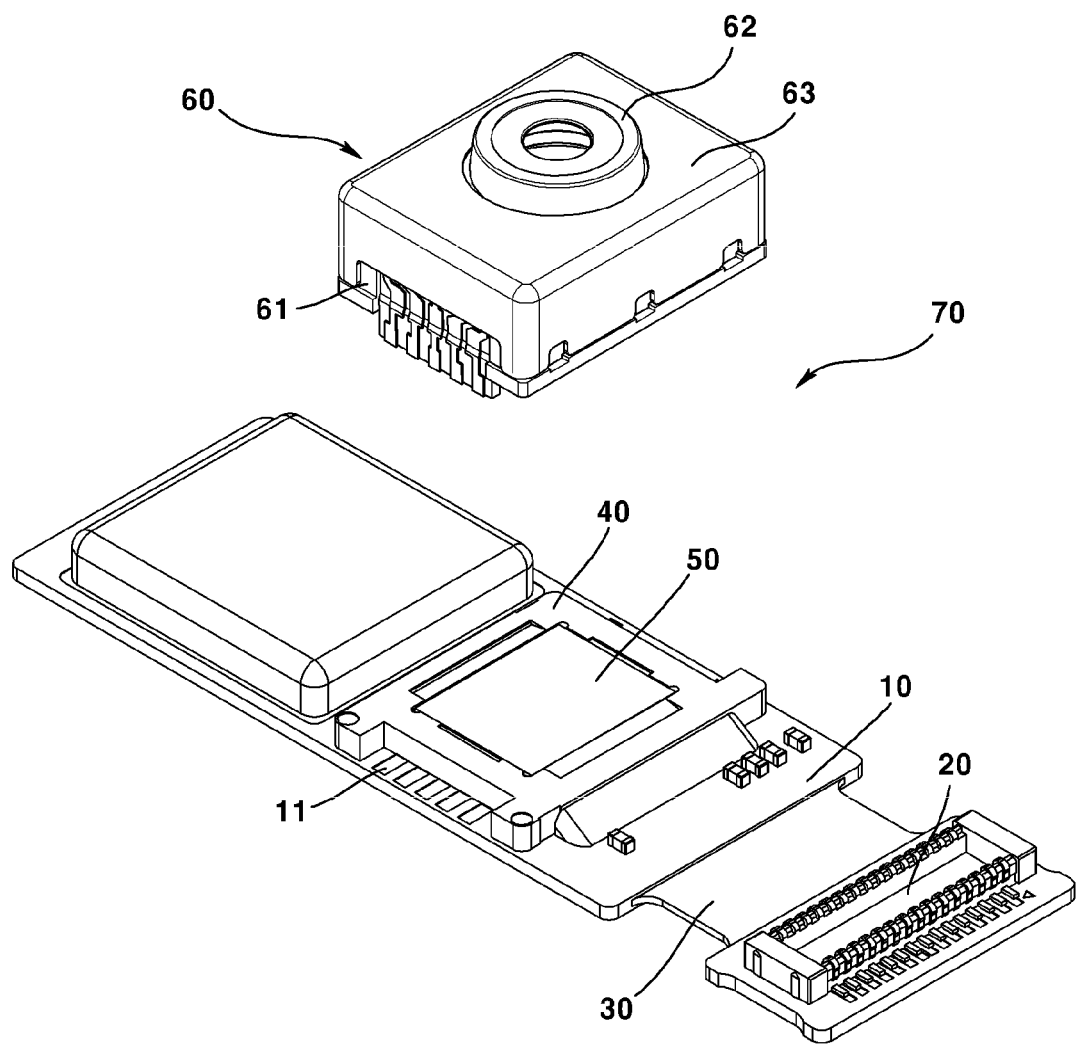
FIG. 7 is an exploded perspective view of the camera module according to the present exemplary embodiment.

FIG. 7 is an exploded perspective view of the camera module according to the present exemplary embodiment.

A camera apparatus may comprise a camera module 70. The camera module 70 may comprise a lens driving device. The lens driving device may be a voice coil motor (VCM). The lens driving device may be a lens driving motor. The lens driving device may be a lens driving actuator. The lens driving device may comprise an AF module. The lens driving device may comprise an OIS module.

The camera module 70 may comprise a substrate 10. The substrate 10 may be a printed circuit board (PCB). The substrate 10 may comprise an upper surface. An image sensor and a sensor base 40 may be disposed on the upper surface of the substrate 10. The substrate 10 may comprise a terminal 11. The terminal 11 of the substrate 10 may be electrically connected to the terminal of a holder 61 through an electro-conducting member.

The camera module 70 may comprise an image sensor (not shown). The image sensor may be disposed in the substrate 10. The image sensor may be disposed on the substrate 10. The image sensor may be disposed on an upper surface of the substrate 10. The image sensor may be electrically connected to the substrate 10. In one example, the image sensor may be coupled to the substrate 10 by surface mounting technology (SMT). As another example, the image sensor may be coupled to the substrate 10 by flip chip technology. The image sensor may be disposed such that the imaging lens and the optical axis coincide. That is, the optical axis of the image sensor and the optical axis of the imaging lens may be aligned. The image sensor may convert light irradiated to the effective image area of the image sensor into an electrical signal. The image sensor may be any one of a charge coupled device (CCD), a metal oxide semi-conductor (MOS), a CPD, and a CID.

The camera module 70 may comprise a connector 20. The connector 20 may be connected to the substrate 10 through a connecting substrate 30. The connector 20 may comprise a port for electrically connecting with an external device.

The camera module 70 may comprise a sensor base 40. The sensor base 40 may be disposed between the holder 61 and the substrate 10. A filter 50 may be disposed on the sensor base 40. An opening may be formed in a portion of the sensor base 40 where the filter 50 is disposed so that light passing through the filter 50 may be incident on the image sensor.

The camera module 70 may comprise a filter 50. The filter 50 may comprise an infrared filter. The infrared filter may block the light of the infrared region from entering the image sensor. The infrared filter can reflect infrared light. Alternatively, the infrared filter may absorb infrared rays. The infrared filter may be disposed between the lens module and the image sensor. The infrared filter may be disposed in the sensor base 40.

The camera module 70 may comprise a lens driving device 60. The lens driving device 60 may comprise a holder 61, a lens holder 62, a cover 63, and an imaging lens. The lens driving device 60 may perform the AF function and/or the OIS function by using a liquid lens. The lens driving device 60 may be disposed in the sensor base 40. As a modified example, the lens driving device 60 may be disposed directly on the substrate 10 without the sensor base 40.

The camera module 70 may comprise a holder 61. The holder 61 may be disposed on the substrate 10. The holder 61 may be disposed in a sensor base 40. The holder 61 may be disposed on an upper surface of the sensor base 40. The holder 61 may be coupled to the sensor base 40. The holder 61 may be combined with a lens module. The holder 61 may be disposed inside a cover 63. The holder 61 may be formed of an insulating material.

The lens module may comprise a lens holder 62. The lens holder 62 may be a lens barrel. The lens holder 62 may be combined with the holder 61. The lens holder 62 may be disposed in the holder 61. The lens holder 62 may accommodate an imaging lens therein. An inner circumferential surface of the lens holder 62 may be formed in a shape corresponding to an outer circumferential surface of the lens. The lens holder 62 may be formed of an insulating material.

The lens module may comprise an imaging lens. The imaging lens may be disposed in a lens holder 62. The imaging lens may comprise a plurality of lenses. The imaging lens may comprise a variable focal lens. The imaging lens may be an imaging lens according to the present exemplary embodiment described above.

The camera module 70 may comprise a cover 63. The cover 63 may cover the holder 61. The cover 63 may be combined with the holder 61. The cover 63 can accommodate may accommodate a portion of the lens module therein. The cover 63 may form an outer appearance of the camera module 70. The cover 63 may have a hexahedron shape with the lower surface open. The cover 63 may be nonmagnetic material. The cover 63 may be formed of a metal material. The cover 63 may be formed of a metal plate. The cover 63 may be connected to the ground portion of the substrate 10. Through this, the cover 63 may be grounded. The cover 63 may shield electromagnetic interference (EMI). In this case, the cover 63 may be referred to as an 'EMI shield can'.

Although exemplary embodiments of the present invention have been described above with reference to the accompanying drawings, it may be understood that those skilled in the art to which the present invention belongs may implement the present invention in other specific forms without changing the technical spirit or essential features thereof. Therefore, it should be understood that the exemplary embodiments described above are exemplary in all respects and not restrictive.

The invention claimed is:

1. An imaging lens system comprising:
   a first lens group comprising at least one solid lens;
   a second lens group spaced apart from the first lens group and comprising at least one solid lens; and
   a variable focal lens disposed between the first lens group and the second lens group,
   wherein the first lens group comprises at least two lenses,
   wherein a stop is located between a pair of lenses of the at least two lenses,
   wherein the at least two lenses of the first lens group comprises a first lens having a positive refractive power, a second lens disposed between the first lens and the variable focal lens, and a third lens disposed between the second lens and variable focal lens,
   wherein the second lens has a negative refractive power,
   wherein a radius of curvature of an object side surface of the first lens is positive,
   wherein a radius of curvature of an image side surface of the first lens is negative,
   wherein a radius of curvature of an object side surface of the second lens is positive,
   wherein a radius of curvature of an image side surface of the second lens is positive,
   wherein a radius of curvature of an object side surface of the third lens is positive,
   wherein a radius of curvature of an image side surface of the third lens is negative, and
   wherein an Abbe number of the first lens is greater than an Abbe number of the second lens and is smaller than an Abbe number of the third lens.

2. The imaging lens system of claim 1, wherein the number of solid lenses of the first lens group is greater than the number of solid lenses of the second lens group.

3. The imaging lens system of claim 1, wherein a lens closest to an object side in the first lens group has a positive refractive power, and
   wherein a lens closest to an image side in the second lens group has a negative refractive power.

4. The imaging lens system of claim 1,
   wherein the second lens group comprises a fifth lens having a positive refractive power and a sixth lens having a negative refractive power.

5. The imaging lens system of claim 4, wherein the third lens has a positive refractive power,
   wherein the following Conditional Expression 1 is satisfied:

$1 < THlg1/THlg2 < 2$      [Conditional Expression 1]

where THlg1 in Conditional Expression 1 refers to a thickness of the first lens group on an optical axis, THlg2 refers to a thickness of the second lens group on the optical axis, and
   wherein the following Conditional Expression 2 is satisfied:

$|L2R2| < |L2R1|$      [Conditional Expression 2]

where, in Conditional Expression 2, L2R2 refers to a radius of curvature of an image side surface of the second lens, and L2R1 refers to a radius of curvature of an object side surface of the second lens.

6. The imaging lens system of claim 4, wherein the following Conditional Expression 3 is satisfied:

$G2 > G1$      [Conditional Expression 3]

where, in Conditional Expression 3, G1 refers to a refractive index of a material of the first lens, and G2 refers to a refractive index of a material of the second lens.

7. The imaging lens system of claim 4, wherein, on an optical axis, a distance between the third lens and the variable focal lens is shorter than a distance between the fifth lens and the variable focal lens.

8. The imaging lens system of claim 1, wherein the following Conditional Expression 4 is satisfied:

$0.1 < THlg1/TTL < 0.5$      [Conditional Expression 4]

where, in Conditional Expression 4, THlg1 refers to the thickness of the first lens group on an optical axis, and TTL refers to a distance from an object side surface of the first lens group to an imaging surface on the optical axis.

9. The imaging lens system of claim 1, wherein the following Conditional Expression 6 is satisfied:

$0 < Fg1/|Fg2| < 0.5$      [Conditional Expression 6]

where, in Conditional Expression 6, Fg1 refers to a focal length of the first lens group and Fg2 refers to a focal length of the second lens group.

10. The imaging lens system of claim 1, wherein the second lens group comprises a sixth lens having a negative refractive power,
    wherein a radius of curvature of an object side surface of the sixth lens is positive, and
    wherein a radius of curvature of an image side surface of the sixth lens is positive.

11. The imaging lens system of claim 10, wherein the second lens group comprises a fifth lens disposed between the sixth lens and the variable focal lens,
    wherein the fifth lens has a positive refractive power,
    wherein a radius of curvature of an object side surface of the fifth lens is negative, and
    wherein a radius of curvature of an image side surface of the fifth lens is negative.

12. The imaging lens system of claim 11, wherein an absolute value of the radius of curvature of the object side surface of the fifth lens is greater than an absolute value of the radius of curvature of the image side surface of the fifth lens.

13. The imaging lens system of claim 1, wherein the variable focal lens comprises first and second liquids contacted with each other,
    wherein the first liquid is a nonconductive liquid, and
    wherein the second liquid is a conductive liquid.

14. The imaging lens system of claim 1, wherein the variable focal lens has a variable refractive power which is in the range of 1.40 diopters to 19.23 diopters.

15. A camera module comprising:
    an image sensor;
    the imaging lens system of claim 1; and
    a filter disposed between the image sensor and the imaging lens.

16. The imaging lens system of claim 1, wherein the following Conditional Expression 7 is satisfied:

$0.1 < d1/TTL < 0.4$      [Conditional Expression 7]

where, in Conditional Expression 7, d1 is a distance between the first lens group and the second lens group on an optical axis, and TTL refers to a distance from an object side surface of the first lens group to an imaging surface on the optical axis.

17. The imaging lens system of claim 16, wherein an absolute value of the radius of curvature of the object side surface of the third lens is smaller than an absolute value of the radius of curvature of the image side surface of the third lens.

18. The imaging lens system of claim 1, wherein the second lens group has only two lenses.

* * * * *